(12) United States Patent
Stojancic et al.

(10) Patent No.: US 11,138,438 B2
(45) Date of Patent: Oct. 5, 2021

(54) VIDEO PROCESSING FOR EMBEDDED INFORMATION CARD LOCALIZATION AND CONTENT EXTRACTION

(71) Applicant: STATS LLC, Chicago, IL (US)

(72) Inventors: Mihailo Stojancic, San Jose, CA (US); Warren Packard, Palo Alto, CA (US); Dennis Kanygin, Sunnyvale, CA (US)

(73) Assignee: STATS LLC, Chicago, IL (US)

( * ) Notice: Subject to any disclaimer, the term of this patent is extended or adjusted under 35 U.S.C. 154(b) by 0 days.

(21) Appl. No.: 16/411,713

(22) Filed: May 14, 2019

(65) Prior Publication Data

US 2019/0354764 A1   Nov. 21, 2019

Related U.S. Application Data

(60) Provisional application No. 62/673,412, filed on May 18, 2018, provisional application No. 62/673,411, (Continued)

(51) Int. Cl.
*H04N 7/18* (2006.01)
*G06K 9/00* (2006.01)
(Continued)

(52) U.S. Cl.
CPC ....... *G06K 9/00724* (2013.01); *G06F 16/908* (2019.01); *G06K 9/00335* (2013.01);
(Continued)

(58) Field of Classification Search
CPC .. H04N 7/18; H04N 7/16; G06K 9/00; G06K 9/00724; G06K 9/00758; G06T 7/12; G06T 2207/20132; G06T 2209/00738
(Continued)

(56) References Cited

U.S. PATENT DOCUMENTS 6,005,562 A    12/1999  Shiga et al.
6,177,931 B1    1/2001  Alexander et al.
(Continued)

FOREIGN PATENT DOCUMENTS

CN    101650722    10/2011
CN    105912560     8/2016
(Continued)

OTHER PUBLICATIONS

US 10,462,538 B2, 10/2019, Packard et al. (withdrawn)
(Continued)

*Primary Examiner* — Trang U Tran
(74) *Attorney, Agent, or Firm* — DLA Piper LLP (US)

(57) ABSTRACT

Metadata for one or more highlights of a video stream may be extracted from one or more card images embedded in the video stream. The highlights may be segments of the video stream, such as a broadcast of a sporting event, that are of particular interest. According to one method, video frames of the video stream are stored. One or more information cards embedded in a decoded video frame may be detected by analyzing one or more predetermined video frame regions. Image segmentation, edge detection, and/or closed contour identification may then be performed on identified video frame region(s). Further processing may include obtaining a minimum rectangular perimeter area enclosing all remaining segments, which may then be further processed to determine precise boundaries of information card(s). The card image(s) may be analyzed to obtain metadata, which may be stored in association with at least one of the video frames.

30 Claims, 16 Drawing Sheets

Related U.S. Application Data filed on May 18, 2018, provisional application No. 62/673,413, filed on May 18, 2018, provisional application No. 62/680,955, filed on Jun. 5, 2018, provisional application No. 62/712,041, filed on Jul. 30, 2018, provisional application No. 62/746,454, filed on Oct. 16, 2018.

(51) Int. Cl.

| | | |
|---|---|---|
| *G06T 7/12* | (2017.01) | |
| *G06K 9/34* | (2006.01) | |
| *H04N 21/435* | (2011.01) | |
| *H04N 21/44* | (2011.01) | |
| *H04N 21/458* | (2011.01) | |
| *H04N 21/81* | (2011.01) | |
| *H04N 21/84* | (2011.01) | |
| *G06F 16/908* | (2019.01) | |

(52) U.S. Cl.
CPC ..... *G06K 9/00718* (2013.01); *G06K 9/00744* (2013.01); *G06K 9/00758* (2013.01); *G06K 9/344* (2013.01); *G06T 7/12* (2017.01); *H04N 21/435* (2013.01); *H04N 21/44008* (2013.01); *H04N 21/458* (2013.01); *H04N 21/8133* (2013.01); *H04N 21/84* (2013.01); *G06K 2009/00738* (2013.01); *G06T 2207/20132* (2013.01)

(58) Field of Classification Search
USPC .................................. 348/157; 725/135, 105
See application file for complete search history.

(56) References Cited

U.S. PATENT DOCUMENTS

| | | | |
|---|---|---|---|
| 6,185,527 B1 | 2/2001 | Petkovic et al. | |
| 6,195,458 B1 | 2/2001 | Warnick et al. | |
| 6,557,042 B1 | 4/2003 | He et al. | |
| 6,681,396 B1 | 1/2004 | Bates et al. | |
| 6,721,490 B1 | 4/2004 | Yao et al. | |
| 6,954,611 B2 | 10/2005 | Hashimoto et al. | |
| 7,174,512 B2 | 2/2007 | Martin et al. | |
| 7,197,715 B1 | 3/2007 | Valeria | |
| 7,386,217 B2 | 6/2008 | Zhang | |
| 7,543,322 B1 | 6/2009 | Bhogal et al. | |
| 7,633,887 B2 | 12/2009 | Panwar et al. | |
| 7,646,962 B1 | 1/2010 | Ellis et al. | |
| 7,680,894 B2 | 3/2010 | Diot et al. | |
| 7,742,111 B2 | 6/2010 | Shiu et al. | |
| 7,774,811 B2 | 8/2010 | Poslinski et al. | |
| 7,818,368 B2 | 10/2010 | Yang et al. | |
| 7,825,989 B1 | 11/2010 | Greenberg | |
| 7,831,112 B2 | 11/2010 | Wang et al. | |
| 7,849,487 B1 | 12/2010 | Vosseller | |
| 7,929,808 B2 | 4/2011 | Seaman et al. | |
| 8,024,753 B1 | 9/2011 | Kummer et al. | |
| 8,046,798 B1 | 10/2011 | Schlack et al. | |
| 8,079,052 B2 | 12/2011 | Chen et al. | |
| 8,099,315 B2 | 1/2012 | Amento | |
| 8,104,065 B2 | 1/2012 | Aaby et al. | |
| 8,140,570 B2 | 3/2012 | Ingrassia et al. | |
| 8,196,168 B1 | 6/2012 | Bryan et al. | |
| 8,209,713 B1 | 6/2012 | Lai et al. | |
| 8,269,857 B2 * | 9/2012 | Ishizaka | G06F 16/58 |
| | | | 348/231.2 |
| 8,296,797 B2 | 10/2012 | Olstad et al. | |
| 8,296,808 B2 | 10/2012 | Hardacker et al. | |
| 8,312,486 B1 | 11/2012 | Briggs et al. | |
| 8,320,674 B2 | 11/2012 | Guillou et al. | |
| 8,424,041 B2 | 4/2013 | Candelore et al. | |
| 8,427,356 B1 | 4/2013 | Satish | |
| 8,457,768 B2 | 6/2013 | Hammer et al. | |
| 8,522,300 B2 * | 8/2013 | Relyea | A63F 13/537 |
| | | | 725/135 |
| 8,535,131 B2 | 9/2013 | Packard et al. | |
| 8,595,763 B1 | 11/2013 | Packard et al. | |
| 8,627,349 B2 | 1/2014 | Kirby et al. | |
| 8,688,434 B1 | 4/2014 | Birnbaum et al. | |
| 8,689,258 B2 | 4/2014 | Kemo | |
| 8,702,504 B1 | 4/2014 | Hughes et al. | |
| 8,713,008 B2 | 4/2014 | Negi | |
| 8,752,084 B1 | 6/2014 | Lai et al. | |
| 8,793,579 B2 | 7/2014 | Halliday et al. | |
| 8,923,607 B1 | 12/2014 | Kwatra et al. | |
| 8,966,513 B2 | 2/2015 | John et al. | |
| 8,973,038 B2 | 3/2015 | Gratton | |
| 8,973,068 B2 | 3/2015 | Kotecha et al. | |
| 8,990,418 B1 | 3/2015 | Bragg et al. | |
| 9,038,127 B2 | 5/2015 | Hastings et al. | |
| 9,060,210 B2 | 6/2015 | Packard et al. | |
| 9,066,156 B2 | 6/2015 | Kapa | |
| 9,213,986 B1 | 12/2015 | Buchheit et al. | |
| 9,251,853 B2 | 2/2016 | Jeong et al. | |
| 9,253,533 B1 | 2/2016 | Morgan et al. | |
| 9,264,779 B2 | 2/2016 | Kirby et al. | |
| 9,420,333 B2 | 8/2016 | Martch et al. | |
| 9,451,202 B2 | 9/2016 | Beals | |
| 9,565,474 B2 | 2/2017 | Petruzzelli et al. | |
| 9,578,377 B1 | 2/2017 | Malik et al. | |
| 9,583,149 B2 | 2/2017 | Stieglitz | |
| 9,648,379 B2 | 5/2017 | Howcroft | |
| 9,715,902 B2 | 7/2017 | Coviello et al. | |
| 9,788,062 B2 | 10/2017 | Dimov et al. | |
| 9,805,268 B2 | 10/2017 | Xing et al. | |
| 10,056,116 B2 | 8/2018 | Packard et al. | |
| 10,297,287 B2 | 5/2019 | Maisenbacher et al. | |
| 10,419,830 B2 | 9/2019 | Packard et al. | |
| 10,433,030 B2 | 10/2019 | Packard et al. | |
| 2001/0013123 A1 | 8/2001 | Freeman et al. | |
| 2001/0026609 A1 | 10/2001 | Weinstein et al. | |
| 2002/0041752 A1 | 4/2002 | Abiko et al. | |
| 2002/0059610 A1 | 5/2002 | Ellis | |
| 2002/0067376 A1 | 6/2002 | Martin et al. | |
| 2002/0075402 A1 | 6/2002 | Robson et al. | |
| 2002/0136528 A1 | 9/2002 | Dagtas | |
| 2002/0157095 A1 | 10/2002 | Masumitsu et al. | |
| 2002/0157101 A1 | 10/2002 | Schrader et al. | |
| 2002/0174430 A1 | 11/2002 | Ellis et al. | |
| 2002/0178444 A1 | 11/2002 | Trajkovic et al. | |
| 2002/0180774 A1 | 12/2002 | Errico et al. | |
| 2002/0194095 A1 | 12/2002 | Koren | |
| 2003/0012554 A1 | 1/2003 | Zeidler et al. | |
| 2003/0023742 A1 | 1/2003 | Allen et al. | |
| 2003/0056220 A1 | 3/2003 | Thornton et al. | |
| 2003/0063798 A1 | 4/2003 | Li et al. | |
| 2003/0066077 A1 | 4/2003 | Gutta | |
| 2003/0118014 A1 | 6/2003 | Iyer et al. | |
| 2003/0126605 A1 | 7/2003 | Betz et al. | |
| 2003/0126606 A1 | 7/2003 | Buczak et al. | |
| 2003/0154475 A1 | 8/2003 | Rodriguez et al. | |
| 2003/0172376 A1 | 9/2003 | Coffin | |
| 2003/0188317 A1 | 10/2003 | Liew et al. | |
| 2003/0189674 A1 | 10/2003 | Inoue et al. | |
| 2003/0208763 A1 | 11/2003 | McElhatten et al. | |
| 2003/0229899 A1 | 12/2003 | Thompson et al. | |
| 2004/0003403 A1 | 1/2004 | Marsh | |
| 2004/0041831 A1 | 3/2004 | Zhang | |
| 2004/0167767 A1 | 8/2004 | Xiong et al. | |
| 2004/0181807 A1 | 9/2004 | Theiste et al. | |
| 2005/0005308 A1 | 1/2005 | Logan et al. | |
| 2005/0015712 A1 | 1/2005 | Plastina | |
| 2005/0030977 A1 | 2/2005 | Casev et al. | |
| 2005/0044570 A1 | 2/2005 | Poslinski | |
| 2005/0071865 A1 | 3/2005 | Martins | |
| 2005/0071881 A1 | 3/2005 | Deshpande | |
| 2005/0091690 A1 | 4/2005 | Delpuch et al. | |
| 2005/0120368 A1 | 6/2005 | Goronzy et al. | |
| 2005/0125302 A1 | 6/2005 | Brown et al. | |
| 2005/0149965 A1 | 7/2005 | Neogi | |
| 2005/0152565 A1 | 7/2005 | Jouppi et al. | |
| 2005/0154987 A1 | 7/2005 | Otsuka et al. | |

(56) References Cited

U.S. PATENT DOCUMENTS

| | | |
|---|---|---|
| 2005/0166230 A1 | 7/2005 | Gaydou et al. |
| 2005/0180568 A1 | 8/2005 | Krause |
| 2005/0182792 A1 | 8/2005 | Israel et al. |
| 2005/0191041 A1 | 9/2005 | Braun et al. |
| 2005/0198570 A1 | 9/2005 | Otsuka et al. |
| 2005/0204294 A1 | 9/2005 | Burke |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0218573 A1 | 9/2006 | Proebstel |
| 2006/0238656 A1 | 10/2006 | Chen et al. |
| 2006/0253581 A1 | 11/2006 | Dixon et al. |
| 2006/0282852 A1 | 12/2006 | Purpura et al. |
| 2006/0282869 A1 | 12/2006 | Plourde |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1 | 7/2007 | Cordray |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0157285 A1 | 7/2007 | Frank et al. |
| 2007/0162924 A1 | 7/2007 | Radhakrishnan et al. |
| 2007/0169165 A1 | 7/2007 | Crull et al. |
| 2007/0188655 A1 | 8/2007 | Ohta |
| 2007/0199040 A1 | 8/2007 | Kates |
| 2007/0201764 A1 | 8/2007 | Jung et al. |
| 2007/0204302 A1 | 8/2007 | Calzone |
| 2007/0212023 A1 | 9/2007 | Whillock |
| 2007/0226766 A1 | 9/2007 | Poslinski et al. |
| 2007/0239856 A1 | 10/2007 | Abadir |
| 2007/0245379 A1 | 10/2007 | Agnihortri |
| 2007/0250777 A1 | 10/2007 | Chen et al. |
| 2007/0288951 A1 | 12/2007 | Ray et al. |
| 2008/0022012 A1 | 1/2008 | Wang |
| 2008/0060006 A1 | 3/2008 | Shanks et al. |
| 2008/0064490 A1 | 3/2008 | Ellis |
| 2008/0086743 A1 | 4/2008 | Cheng et al. |
| 2008/0092168 A1 | 4/2008 | Logan et al. |
| 2008/0097949 A1 | 4/2008 | Kelly et al. |
| 2008/0109307 A1 | 5/2008 | Ullah |
| 2008/0115166 A1 | 5/2008 | Bhogal et al. |
| 2008/0134043 A1 | 6/2008 | Georgis et al. |
| 2008/0155602 A1* | 6/2008 | Collet ............... H04N 21/443 725/46 |
| 2008/0159708 A1 | 7/2008 | Kazama et al. |
| 2008/0163305 A1 | 7/2008 | Johnson et al. |
| 2008/0168503 A1 | 7/2008 | Sparrell |
| 2008/0175486 A1 | 7/2008 | Yamamoto |
| 2008/0178219 A1 | 7/2008 | Grannan |
| 2008/0193016 A1 | 8/2008 | Lim et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0244666 A1 | 10/2008 | Moon et al. |
| 2008/0270038 A1 | 10/2008 | Partovi et al. |
| 2008/0271078 A1 | 10/2008 | Gossweiler et al. |
| 2008/0300982 A1 | 12/2008 | Larson et al. |
| 2008/0303942 A1 | 12/2008 | Chang et al. |
| 2008/0307485 A1 | 12/2008 | Clement et al. |
| 2008/0320523 A1 | 12/2008 | Morris et al. |
| 2009/0025027 A1 | 1/2009 | Craner |
| 2009/0034932 A1 | 2/2009 | Oisel |
| 2009/0055385 A1 | 2/2009 | Jean et al. |
| 2009/0080857 A1 | 3/2009 | St. John-Larkin |
| 2009/0082110 A1 | 3/2009 | Relyea et al. |
| 2009/0102984 A1 | 4/2009 | Arlina et al. |
| 2009/0138902 A1 | 5/2009 | Kamen |
| 2009/0144777 A1 | 6/2009 | Mikami et al. |
| 2009/0158357 A1 | 6/2009 | Miller |
| 2009/0178071 A1 | 7/2009 | Whitehead |
| 2009/0210898 A1 | 8/2009 | Childress et al. |
| 2009/0228911 A1 | 9/2009 | Vriisen |
| 2009/0234828 A1 | 9/2009 | Tu |
| 2009/0235313 A1 | 9/2009 | Maruyama et al. |
| 2009/0249412 A1 | 10/2009 | Bhogal et al. |
| 2009/0293093 A1 | 11/2009 | Igarashi |
| 2009/0299824 A1 | 12/2009 | Barnes |
| 2009/0325523 A1 | 12/2009 | Choi |
| 2010/0040151 A1 | 2/2010 | Garrett |
| 2010/0064306 A1 | 3/2010 | Tiongson et al. |
| 2010/0071007 A1 | 3/2010 | Meijer |
| 2010/0071062 A1 | 3/2010 | Choyi et al. |
| 2010/0086277 A1 | 4/2010 | Craner |
| 2010/0089996 A1 | 4/2010 | Koolar |
| 2010/0115554 A1 | 5/2010 | Drouet et al. |
| 2010/0122294 A1 | 5/2010 | Craner |
| 2010/0123830 A1 | 5/2010 | Vunic |
| 2010/0125864 A1 | 5/2010 | Dwyer et al. |
| 2010/0146560 A1 | 6/2010 | Bonfrer |
| 2010/0153856 A1 | 6/2010 | Russ |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0251304 A1 | 9/2010 | Donoghue et al. |
| 2010/0251305 A1 | 9/2010 | Kimble et al. |
| 2010/0262986 A1 | 10/2010 | Adimatvam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Marita |
| 2011/0016493 A1 | 1/2011 | Lee et al. |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0082858 A1 | 4/2011 | Yu et al. |
| 2011/0096228 A1 | 4/2011 | Deigmoeller et al. |
| 2011/0109801 A1 | 5/2011 | Thomas et al. |
| 2011/0138418 A1 | 6/2011 | Choi et al. |
| 2011/0161242 A1 | 6/2011 | Chung et al. |
| 2011/0173337 A1 | 7/2011 | Walsh et al. |
| 2011/0202956 A1 | 8/2011 | Connelly et al. |
| 2011/0206342 A1 | 8/2011 | Thompson et al. |
| 2011/0212756 A1 | 9/2011 | Packard et al. |
| 2011/0217024 A1 | 9/2011 | Schlieski et al. |
| 2011/0231887 A1 | 9/2011 | West |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0047542 A1 | 2/2012 | Lewis et al. |
| 2012/0052941 A1 | 3/2012 | Mo |
| 2012/0060178 A1 | 3/2012 | Minakuchi et al. |
| 2012/0082431 A1 | 4/2012 | Sengupta et al. |
| 2012/0106932 A1 | 5/2012 | Grevers, Jr. |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0131613 A1 | 5/2012 | Ellis et al. |
| 2012/0185895 A1 | 7/2012 | Wong et al. |
| 2012/0204209 A1 | 8/2012 | Kuba |
| 2012/0216118 A1 | 8/2012 | Lin et al. |
| 2012/0230651 A1 | 9/2012 | Chen |
| 2012/0237182 A1 | 9/2012 | Eyer |
| 2012/0246672 A1 | 9/2012 | Sridhar et al. |
| 2012/0260295 A1 | 10/2012 | Rondeau |
| 2012/0263439 A1 | 10/2012 | Lassman et al. |
| 2012/0278834 A1 | 11/2012 | Richardson |
| 2012/0278837 A1 | 11/2012 | Gurtis et al. |
| 2012/0284745 A1 | 11/2012 | Strange |

(56) References Cited

U.S. PATENT DOCUMENTS

| | | |
|---|---|---|
| 2012/0311633 A1 | 12/2012 | Mandrekar et al. |
| 2012/0324491 A1 | 12/2012 | Bathiche et al. |
| 2013/0014159 A1 | 1/2013 | Wiser et al. |
| 2013/0042179 A1 | 2/2013 | Cormack et al. |
| 2013/0055304 A1 | 2/2013 | Kirby et al. |
| 2013/0061313 A1 | 3/2013 | Cullimore et al. |
| 2013/0073473 A1 | 3/2013 | Heath |
| 2013/0074109 A1 | 3/2013 | Skelton et al. |
| 2013/0114940 A1 | 5/2013 | Merzon et al. |
| 2013/0128119 A1 | 5/2013 | Madathodivil et al. |
| 2013/0138435 A1 | 5/2013 | Weber |
| 2013/0138693 A1 | 5/2013 | Sathish et al. |
| 2013/0145023 A1 | 6/2013 | Li et al. |
| 2013/0160051 A1 | 6/2013 | Armstrong et al. |
| 2013/0174196 A1 | 7/2013 | Herlein |
| 2013/0194503 A1 | 8/2013 | Yamashita |
| 2013/0226983 A1 | 8/2013 | Beining et al. |
| 2013/0251331 A1 | 9/2013 | Sambongi |
| 2013/0263189 A1 | 10/2013 | Garner |
| 2013/0268620 A1 | 10/2013 | Osminer |
| 2013/0268955 A1 | 10/2013 | Conrad et al. |
| 2013/0283162 A1 | 10/2013 | Aronsson et al. |
| 2013/0291037 A1 | 10/2013 | Im et al. |
| 2013/0298146 A1 | 11/2013 | Conrad et al. |
| 2013/0298151 A1 | 11/2013 | Leske et al. |
| 2013/0325869 A1 | 12/2013 | Reiley et al. |
| 2013/0326406 A1 | 12/2013 | Reiley et al. |
| 2013/0326575 A1 | 12/2013 | Robillard et al. |
| 2013/0332962 A1 | 12/2013 | Moritz et al. |
| 2013/0332965 A1 | 12/2013 | Seyller et al. |
| 2013/0346302 A1 | 12/2013 | Purves et al. |
| 2014/0023348 A1 | 1/2014 | O'Kelly et al. |
| 2014/0028917 A1 | 1/2014 | Smith et al. |
| 2014/0032709 A1 | 1/2014 | Saussy et al. |
| 2014/0062696 A1 | 3/2014 | Packard et al. |
| 2014/0067825 A1 | 3/2014 | Oztaskent et al. |
| 2014/0067828 A1 | 3/2014 | Archibong |
| 2014/0067939 A1 | 3/2014 | Packard et al. |
| 2014/0068675 A1 | 3/2014 | Mountain |
| 2014/0068692 A1 | 3/2014 | Archibong et al. |
| 2014/0074866 A1 | 3/2014 | Shah |
| 2014/0082670 A1 | 3/2014 | Papish |
| 2014/0088952 A1 | 3/2014 | Fife et al. |
| 2014/0114647 A1 | 4/2014 | Allen |
| 2014/0114966 A1 | 4/2014 | Bilinski et al. |
| 2014/0123160 A1 | 5/2014 | van Coppenolle et al. |
| 2014/0130094 A1 | 5/2014 | Kirby et al. |
| 2014/0139555 A1 | 5/2014 | Levy |
| 2014/0140680 A1 | 5/2014 | Jo |
| 2014/0150009 A1 | 5/2014 | Sharma |
| 2014/0153904 A1 | 6/2014 | Adimatvam et al. |
| 2014/0157327 A1 | 6/2014 | Roberts et al. |
| 2014/0161417 A1 | 6/2014 | Kurupacheril et al. |
| 2014/0215539 A1 | 7/2014 | Chen et al. |
| 2014/0223479 A1 | 8/2014 | Krishnamoorthi et al. |
| 2014/0282714 A1 | 9/2014 | Hussain |
| 2014/0282741 A1 | 9/2014 | Shoykhet |
| 2014/0282744 A1 | 9/2014 | Hardy et al. |
| 2014/0282745 A1 | 9/2014 | Chipman et al. |
| 2014/0282759 A1 | 9/2014 | Harvey et al. |
| 2014/0282779 A1 | 9/2014 | Navarro |
| 2014/0294201 A1 | 10/2014 | Johnson et al. |
| 2014/0298378 A1 | 10/2014 | Kelley |
| 2014/0310819 A1 | 10/2014 | Cakarel et al. |
| 2014/0313341 A1 | 10/2014 | Stribling |
| 2014/0321831 A1 | 10/2014 | Olsen et al. |
| 2014/0325556 A1 | 10/2014 | Hoang et al. |
| 2014/0331260 A1 | 11/2014 | Gratton |
| 2014/0333841 A1 | 11/2014 | Steck |
| 2014/0351045 A1 | 11/2014 | Abihssira et al. |
| 2014/0373079 A1 | 12/2014 | Friedrich et al. |
| 2015/0003814 A1 | 1/2015 | Miller |
| 2015/0012656 A1 | 1/2015 | Phillips et al. |
| 2015/0020097 A1 | 1/2015 | Freed et al. |
| 2015/0040176 A1 | 2/2015 | Hybertson et al. |
| 2015/0052568 A1 | 2/2015 | Glennon et al. |
| 2015/0058890 A1 | 2/2015 | Kapa |
| 2015/0082172 A1 | 3/2015 | Shakib et al. |
| 2015/0095932 A1 | 4/2015 | Ren |
| 2015/0110461 A1 | 4/2015 | Maisenbacher et al. |
| 2015/0110462 A1 | 4/2015 | Maisenbacher et al. |
| 2015/0118992 A1 | 4/2015 | Wyatt et al. |
| 2015/0181132 A1 | 6/2015 | Kummer et al. |
| 2015/0181279 A1 | 6/2015 | Martch et al. |
| 2015/0189377 A1 | 7/2015 | Wheatley et al. |
| 2015/0243326 A1 | 8/2015 | Pacurariu et al. |
| 2015/0249803 A1 | 9/2015 | Tozer et al. |
| 2015/0249864 A1 | 9/2015 | Tang et al. |
| 2015/0281778 A1 | 10/2015 | Xhafa et al. |
| 2015/0310725 A1 | 10/2015 | Koskan et al. |
| 2015/0310894 A1 | 10/2015 | Stieglitz |
| 2015/0334461 A1 | 11/2015 | Yu |
| 2015/0358687 A1 | 12/2015 | Kummer |
| 2015/0358688 A1 | 12/2015 | Kummer |
| 2016/0066020 A1 | 3/2016 | Mountain |
| 2016/0066026 A1 | 3/2016 | Mountain |
| 2016/0066042 A1 | 3/2016 | Dimov |
| 2016/0066049 A1 | 3/2016 | Mountain |
| 2016/0066056 A1 | 3/2016 | Mountain |
| 2016/0073172 A1 | 3/2016 | Sharples |
| 2016/0088351 A1 | 3/2016 | Petruzzelli |
| 2016/0105708 A1 | 4/2016 | Packard et al. |
| 2016/0105733 A1 | 4/2016 | Packard et al. |
| 2016/0105734 A1 | 4/2016 | Packard et al. |
| 2016/0191147 A1 | 6/2016 | Martch |
| 2016/0198229 A1 | 7/2016 | Keipert |
| 2016/0261929 A1 | 9/2016 | Lee et al. |
| 2016/0309212 A1 | 10/2016 | Martch et al. |
| 2018/0014072 A1 | 1/2018 | Dimov et al. |

FOREIGN PATENT DOCUMENTS

| | | |
|---|---|---|
| EP | 1469476 | 10/2004 |
| EP | 1865716 | 12/2007 |
| EP | 2902568 | 12/2007 |
| EP | 2107477 | 10/2009 |
| EP | 2309733 | 4/2011 |
| EP | 2403239 | 1/2012 |
| EP | 2464138 | 6/2012 |
| JP | 10322622 | 12/1998 |
| JP | 2001251581 | 9/2001 |
| JP | 2004072540 | 3/2004 |
| JP | 2004260297 | 9/2004 |
| JP | 2005-317165 | 11/2005 |
| JP | 2006211311 | 8/2006 |
| JP | 2006-245745 | 9/2006 |
| JP | 2006333451 | 12/2006 |
| JP | 2007202206 | 8/2007 |
| JP | 2008167019 | 7/2008 |
| JP | 2012-029150 | 2/2012 |
| JP | 5034516 | 9/2012 |
| JP | 2013-175854 | 9/2013 |
| JP | 2014-157460 | 8/2014 |
| JP | 2014187687 | 10/2014 |
| KR | 2004-0025073 | 3/2004 |
| KR | 2006-0128295 | 12/2006 |
| WO | 9837694 | 8/1998 |
| WO | 0243353 | 5/2002 |
| WO | 2005059807 | 6/2005 |
| WO | 2007064987 | 6/2007 |
| WO | 2007098067 | 8/2007 |
| WO | 2009073925 | 6/2009 |
| WO | 2011040999 | 4/2011 |
| WO | 2013016626 | 1/2013 |
| WO | 2013166456 | 11/2013 |
| WO | 2014072742 | 5/2014 |
| WO | 2014164782 | 10/2014 |
| WO | 2014179017 | 11/2014 |
| WO | 2016030380 | 3/2016 |
| WO | 2016030384 | 3/2016 |
| WO | 2016030477 | 3/2016 |
| WO | 2016033545 | 3/2016 |
| WO | 2016034899 | 3/2016 |

(56) References Cited

FOREIGN PATENT DOCUMENTS

| WO | 2016055761 | 4/2016 |
|---|---|---|
| WO | 2016057416 | 4/2016 |
| WO | 2016057844 | 4/2016 |

OTHER PUBLICATIONS

Boxfish/TV's API; www.boxfish.com, (retrieved Mar. 28, 2017), 5 pages.
International Search Report for PCT/US2014/060651 dated Jan. 19, 2015 (9 pages).
International Search Report for PCT/US2014/060649 dated Jan. 8, 2015 (9 pages).
Jin, S.H., et al., "Intelligent broadcasting system and services for personalized semantic contents consumption", Expert Systems with Applications, Oxford, GB, vol. 31, No. 1, Jul. 1, 2006, pp. 164-173.
Jin, S.H., et al., "Real-time content filtering for live broadcasts in TV terminals", Multimedia Tools and Applications, Kluwer Academic Publishers, BO, vol. 36, No. 3, Jun. 29, 2007, pp. 285-301.
Thuuz Sports, "Frequently Asked Questions", www.thuuz.com/faq/, (retrieved Mar. 28, 2017), 5 pages.
R. Natarajan et Al. "Audio-Based Event Detection in Videos—A Comprehensive Survey", Int. Journal of Engineering and Technology, vol. 6 No. 4 Aug.-Sep. 2014.
Q. Huang et al. "Hierarchical Language Modeling for Audio Events Detection in a Sports Game", IEEE International Conference on Acoustics, Speech and Signal Processing, 2010.
"Q. Huang et al. "Inferring the Structure of a Tennis Game Using Audio Information", IEEE Trans. on Audio Speech and Language Proc., Oct. 2011."
M. Baillie et al. "Audio-based Event Detection for Sports Video", International Conference on Image and Video, CIVR 2003.
Y. Rui et al. "Automatically Extracting Highlights for TV Baseball Programs", Proceedings of the eighth ACM international conference on Multimedia, 2000.
D. A. Sadlier et al. "A Combined Audio-Visual Contribution to Event Detection in Field Sports Broadcast Video. Case Study: Gaelic Football", Proceedings of the 3rd IEEE International Symposium on Signal Processing and Information Technology, Dec. 2003.
E Kijak et al. "Audiovisual Integration for Tennis Broadcast Structuring", Multimedia Tools and Applications, Springer, vol. 30, Issue 3, pp. 289-311, Sep. 2006.
A. Baijal et al. "Sports Highlights Generation Based on Acoustic Events Detection: A Rugby Case Study", IEEE International Conference on Consumer Electronics (ICCE), pp. 20-23, 2015.
J. Han et al. "A Unified and Efficient Framework for Court-Net Sports Video Analysis Using 3-D Camera Modeling", Proceedings vol. 6506, Multimedia Content Access: Algorithms and Systems; 65060F (2007).
Huang-Chia Shih "A Survey on Content-aware Video Analysis for Sports", IEEE Trans. on Circuits and Systems for Video Technology, vol. 99, No. 9, Jan. 2017.
A. Krizhevsky et al. "ImageNet Classification with Deep Convolutional Neural Networks", In Proc. NIPS, pp. 1097-1105, 2012.
D. A. Sadlier et al. "Event Detection in Field Sports Video Using Audio-Visual Features and a Support Vector Machine", IEEE Trans. on Circuits and Systems for Video Technology, vol. 15, No. 10, Oct. 2005.
P. F. Felzenszwalb et al. "Efficient Graph-Based Image Segmentation", International Journal of Computer Vision, Sep. 2004, vol. 59, Issue 2, pp. 167-181.
C. J. C. Burges "A Tutorial on Support Vector Machines for Pattern Recognition", Springer, Data Mining and Knowledge Discovery, Jun. 1998, vol. 2, Issue 2, pp. 121-167.
Y.A. LeCun et al. "Efficient BackProp" Neural Networks: Tricks of the Trade. Lecture Notes in Computer Science, vol. 7700, Springer, 2012.
L. Neumann, J. Matas, "Real-Time Scene Text Localization and Recognition", 5th IEEE Conference on Computer Vision and Pattern Recognition, Jun. 2012.
R. Smith "An Overview of the Tesseract OCR Engine", International Conference on Document Analysis and Recognition (ICDAR), 2007.
M. Merler, et al., "The Excitement of Sports: Automatic Highlights Using Audio/Visual Cues", Dec. 31, 2017, pp. 2520-2523.
H. Harb, et al., Highlights Detection in Sports Videos Based on Audio Analysis, pp. 1-4, Sep. 2009.
J. Ye, et al., Audio-Based Sports Highlight Detection by Fourier Local-Auto-Correlations, 11th Annual Conference of the International Speech Communication Association, Sep. 2010, pp. 2198-2201.
Miyamori, Hisashi "Automatic Generation of Personalized Digest Based on Context Flow and Distinctive Events", IEICE Technical Report, Jul. 10, 2003, vol. 103, No. 209, pp. 35-40.

\* cited by examiner

VIDEO PROCESSING FOR EMBEDDED INFORMATION CARD LOCALIZATION AND CONTENT EXTRACTION

CROSS-REFERENCE TO RELATED APPLICATIONS

The present application claims the benefit of U.S. Provisional Application Ser. No. 62/673,412 for "Machine Learning for Recognizing and Interpreting Embedded Information Card Content", filed May 18, 2018, which is incorporated herein by reference in its entirety.

The present application claims the benefit of U.S. Provisional Application Ser. No. 62/673,411 for "Video Processing for Enabling Sports Highlights Generation", filed May 18, 2018, which is incorporated herein by reference in its entirety.

The present application claims the benefit of U.S. Provisional Application Ser. No. 62/673,413 for "Video Processing for Embedded Information Card Localization and Content Extraction", filed May 18, 2018, which is incorporated herein by reference in its entirety.

The present application claims the benefit of U.S. Provisional Application Ser. No. 62/680,955 for "Audio Processing for Detecting Occurrences of Crowd Noise in Sporting Event Television Programming", filed Jun. 5, 2018, which is incorporated herein by reference in its entirety.

The present application claims the benefit of U.S. Provisional Application Ser. No. 62/712,041 for "Audio Processing for Extraction of Variable Length Disjoint Segments from Television Signal", filed Jul. 30, 2018, which is incorporated herein by reference in its entirety.

The present application claims the benefit of U.S. Provisional Application Ser. No. 62/746,454 for "Audio Processing for Detecting Occurrences of Loud Sound Characterized by Short-Time Energy Bursts", filed Oct. 16, 2018, which is incorporated herein by reference in its entirety.

The present application is related to U.S. Utility application Ser. No. 13/601,915 for "Generating Excitement Levels for Live Performances," filed Aug. 31, 2012 and issued on Jun. 16, 2015 as U.S. Pat. No. 9,060,210, which is incorporated by reference herein in its entirety.

The present application is related to U.S. Utility application Ser. No. 13/601,927 for "Generating Alerts for Live Performances," filed Aug. 31, 2012 and issued on Sep. 23, 2014 as U.S. Pat. No. 8,842,007, which is incorporated by reference herein in its entirety.

The present application is related to U.S. Utility application Ser. No. 13/601,933 for "Generating Teasers for Live Performances," filed Aug. 31, 2012 and issued on Nov. 26, 2013 as U.S. Pat. No. 8,595,763, which is incorporated by reference herein in its entirety.

The present application is related to U.S. Utility application Ser. No. 14/510,481 for "Generating a Customized Highlight Sequence Depicting an Event", filed Oct. 9, 2014 and issued on Sep. 17, 2019 as U.S. Pat. No. 10,419,830, which is incorporated by reference herein in its entirety.

The present application is related to U.S. Utility application Ser. No. 14/710,438 for "Generating a Customized Highlight Sequence Depicting Multiple Events", filed May 12, 2015 and issued on Oct. 1, 2019 as U.S. Pat. No. 10,433,030, which is incorporated by reference herein in its entirety.

The present application is related to U.S. Utility application Ser. No. 14/877,691 for "Customized Generation of Highlight Show with Narrative Component", filed Oct. 7, 2015 and issued on Jan. 14, 2020 as U.S. Pat. No. 10,536,758, which is incorporated by reference herein in its entirety.

The present application is related to U.S. Utility application Ser. No. 15/264,928 for "User Interface for Interaction with Customized Highlight Shows", filed Sep. 14, 2016, which is incorporated by reference herein in its entirety.

The present application is related to U.S. Utility application Ser. No. 16/411,704 for "Video Processing for Enabling Sports Highlights Generation", filed May 14, 2019, which is incorporated by reference herein in its entirety.

The present application is related to U.S. Utility application Ser. No. 16/411,710 for "Machine Learning for Recognizing and Interpreting Embedded Information Card Content", filed May 14, 2019, which is incorporated by reference herein in its entirety.

TECHNICAL FIELD

The present document relates to techniques for identifying multimedia content and associated information on a television device or a video server delivering multimedia content, and enabling embedded software applications to utilize the multimedia content to provide content and services synchronous with that multimedia content. Various embodiments relate to methods and systems for providing automated video and audio analysis that are used to identify and extract information in sports television video content, and to create metadata associated with video highlights for in-game and post-game reviewing of the sports television video content.

DESCRIPTION OF THE RELATED ART

Enhanced television applications such as interactive advertising and enhanced program guides with pre-game, in-game and post-game interactive applications have long been envisioned. Existing cable systems that were originally engineered for broadcast television are being called on to support a host of new applications and services including interactive television services and enhanced (interactive) programming guides.

Some frameworks for enabling enhanced television applications have been standardized. Examples include the OpenCable™ Enhanced TV Application Messaging Specification, as well as the Tru2way specification, which refer to interactive digital cable services delivered over a cable video network and which include features such as interactive program guides, interactive ads, games, and the like. Additionally, cable operator "OCAP" programs provide interactive services such as e-commerce shopping, online banking, electronic program guides, and digital video recording. These efforts have enabled the first generation of video-synchronous applications, synchronized with video content delivered by the programmer/broadcaster, and providing added data and interactivity to television programming.

Recent developments in video/audio content analysis technologies and capable mobile devices have opened up an array of new possibilities in developing sophisticated applications that operate synchronously with live TV programming events. These new technologies and advances in computer vision and video processing, as well as improved computing power of modern processors, allow for real-time generation of sophisticated programming content highlights accompanied by metadata.

SUMMARY

Methods and systems are presented for automatically finding the location of an information card ("card image"), such as an information score board, in a video frame, or multiple video frames, in sports television broadcast programming. Also described are methods and systems for identifying text strings within various fields of the localized card image, and reading and interpreting textual information from various fields of the localized card image.

In at least one embodiment, the card image detection, localization, and reading are performed synchronously with respect to presentation of sports television programming content. In at least one embodiment, an automated process is provided for receiving a digital video stream, analyzing one or more frames of the digital video stream, and automatically detecting and localizing card image quadrilaterals. In another embodiment, an automated process is provided for analyzing one or more localized card images, recognizing and extracting text strings (for example, in text boxes), and reading information from extracted text boxes.

In yet another embodiment, detected text strings associated with particular fields within the card image are interpreted, thus providing immediate in-game information related to the content of the televised broadcast of the sporting event. The extracted in-frame information may be used to generate metadata related to automatically created custom video content as a set of highlights of broadcast television programming content associated with audiovisual and textual data.

In at least one embodiment, a method for extracting metadata from a video stream may include storing at least a portion of the video stream in a data store. At a processor, one or more card images embedded in at least one of the video frames may be automatically identified and extracted by performing at least one of identifying a predetermined location, within the video frame, that defines a video frame region containing the card image, and sequentially processing a plurality of regions of the video frame to identify the video frame region containing the card image. At the processor, the card image may be analyzed to obtain metadata, which may be stored, at the data store, in association with at least one of the video frames.

In at least one embodiment, the video stream may be a broadcast of a sporting event. The video frames may constitute a highlight deemed to be of particular interest to one or more users. The metadata may be descriptive of a status of the sporting event during the highlight.

In at least one embodiment, the method may further include, at an output device, presenting the metadata during viewing of the highlight. Automatically identifying and extracting a card image and analyzing the card image to obtain the metadata may be carried out, for a highlight, during viewing of the highlight.

In at least one embodiment, the method may further include localizing and extracting the card image from the video frame region. Localizing and extracting the card image from the video frame region may include cropping the video frame to isolate the video frame region. Alternatively, or in addition, localizing and extracting the card image from the video frame region may include segmenting the video frame region, or a processed version of the video frame region, to generate a segmented image, and modifying pixel values of segments adjacent to boundaries of the segmented image. Alternatively, or in addition, localizing and extracting the card image from the video frame region may include removing background from the video frame region or a processed version of the video frame region. Alternatively, or in addition, localizing and extracting the card image from the video frame region may include generating an edge image based on the video frame region, finding contours in the edge image, approximating the contours as polygons, and extracting a region enclosed by a minimum rectangular perimeter encompassing all of the contours to generate a perimeter rectangular image.

In at least one embodiment, the method may further include, iteratively, counting color-modified pixels for each edge of the perimeter rectangular image, and moving any boundary edge, with a number of color-modified pixels exceeding a threshold, inward.

In at least one embodiment, the method may further include validating a quadrilateral detected within the region by counting a first number of pixels in the video frame region, a second number of pixels in a perimeter rectangular image, and a third number of pixels in an adjusted perimeter rectangular image. The first number, the second number, and the third number may be compared to determine whether an assumed quadrilateral within the region is viable.

In at least one embodiment, localizing and extracting the card image from the video frame region may include adjusting a left boundary (or another boundary) of the card image.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION

Definitions

Figure 1A:
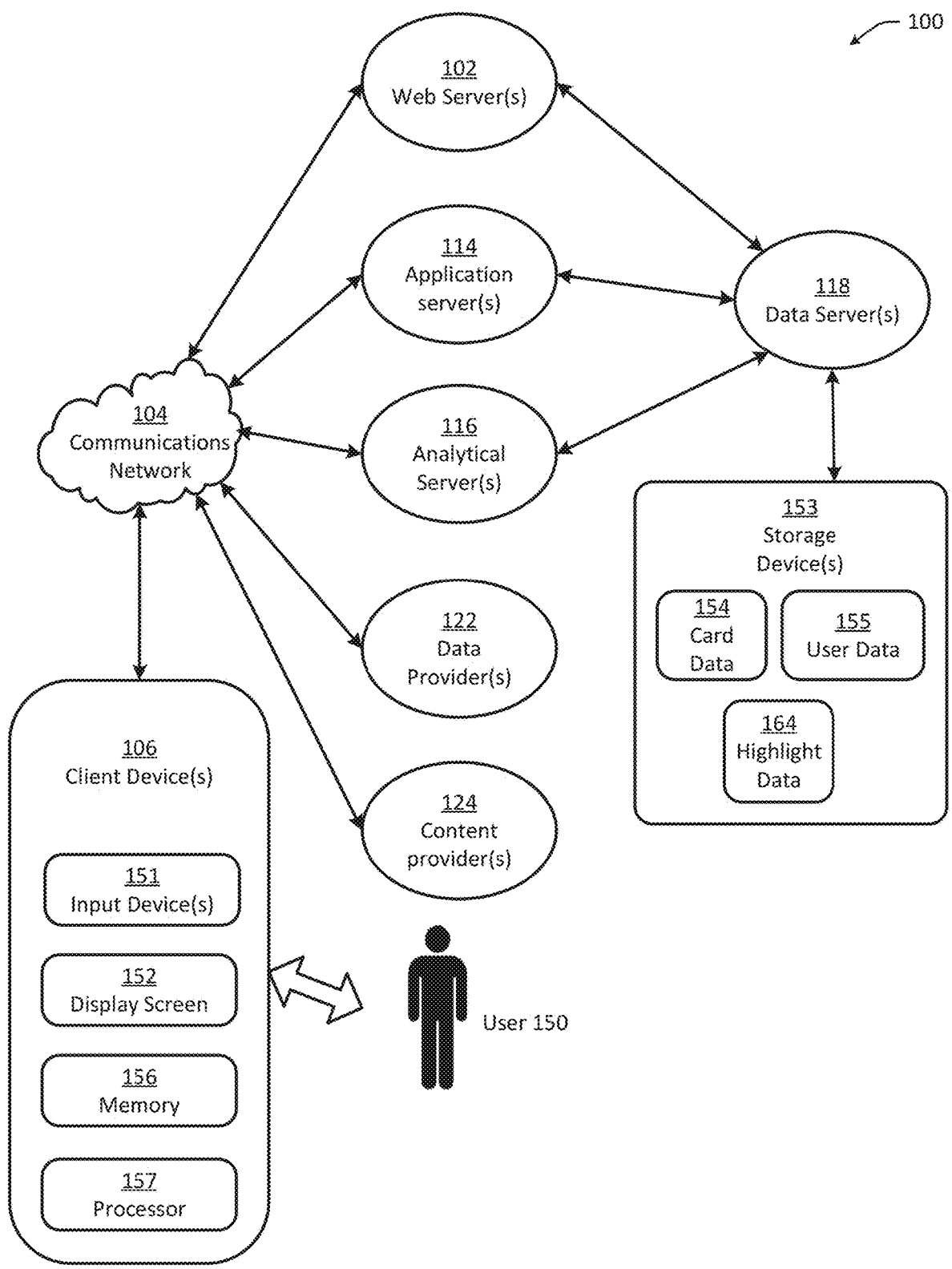
FIG. 1A is a block diagram depicting a hardware architecture according to a client/server embodiment, wherein event content is provided via a network-connected content provider.

The following definitions are presented for explanatory purposes only, and are not intended to limit scope.

Event: For purposes of the discussion herein, the term "event" refers to a game, session, match, series, performance, program, concert, and/or the like, or portion thereof (such as an act, period, quarter, half, inning, scene, chapter, or the like). An event may be a sporting event, entertainment event, a specific performance of a single individual or subset of individuals within a larger population of participants in an event, or the like. Examples of non-sporting events include television shows, breaking news, socio-political incidents, natural disasters, movies, plays, radio shows, podcasts, audiobooks, online content, musical performances, and/or the like. An event can be of any length. For illustrative purposes, the technology is often described herein in terms of sporting events; however, one skilled in the art will recognize that the technology can be used in other contexts as well, including highlight shows for any audiovisual, audio, visual, graphics-based, interactive, non-interactive, or text-based content. Thus, the use of the term "sporting event" and any other sports-specific terminology in the description is intended to be illustrative of one possible embodiment, but is not intended to restrict the scope of the described technology to that one embodiment. Rather, such terminology should be considered to extend to any suitable non-sporting context as appropriate to the technology. For ease of description, the term "event" is also used to refer to an account or representation of an event, such as an audiovisual recording of an event, or any other content item that includes an accounting, description, or depiction of an event.

Highlight: An excerpt or portion of an event, or of content associated with an event, that is deemed to be of particular interest to one or more users. A highlight can be of any length. In general, the techniques described herein provide mechanisms for identifying and presenting a set of customized highlights (which may be selected based on particular characteristics and/or preferences of the user) for any suitable event. "Highlight" can also be used to refer to an account or representation of a highlight, such as an audiovisual recording of a highlight, or any other content item that includes an accounting, description, or depiction of a highlight. Highlights need not be limited to depictions of events themselves, but can include other content associated with an event. For example, for a sporting event, highlights can include in-game audio/video, as well as other content such as pre-game, in-game, and post-game interviews, analysis, commentary, and/or the like. Such content can be recorded from linear television (for example, as part of the video stream depicting the event itself), or retrieved from any number of other sources. Different types of highlights can be provided, including for example, occurrences (plays), strings, possessions, and sequences, all of which are defined below. Highlights need not be of fixed duration, but may incorporate a start offset and/or end offset, as described below.

Content Delineator: One or more video frames that indicate the start or end of a highlight.

Occurrence: Something that takes place during an event. Examples include: a goal, a play, a down, a hit, a save, a shot on goal, a basket, a steal, a snap or attempted snap, a near-miss, a fight, a beginning or end of a game, quarter, half, period, or inning, a pitch, a penalty, an injury, a dramatic incident in an entertainment event, a song, a solo, and/or the like. Occurrences can also be unusual, such as a power outage, an incident with an unruly fan, and/or the like. Detection of such occurrences can be used as a basis for determining whether or not to designate a particular portion of a video stream as a highlight. Occurrences are also referred to herein as "plays", for ease of nomenclature, although such usage should not be construed to limit scope. Occurrences may be of any length, and the representation of an occurrence may be of varying length. For example, as mentioned above, an extended representation of an occurrence may include footage depicting the period of time just before and just after the occurrence, while a brief representation may include just the occurrence itself. Any intermediate representation can also be provided. In at least one embodiment, the selection of a duration for a representation of an occurrence can depend on user preferences, available time, determined level of excitement for the occurrence, importance of the occurrence, and/or any other factors.

Offset: The amount by which a highlight length is adjusted. In at least one embodiment, a start offset and/or end offset can be provided, for adjusting start and/or end times of the highlight, respectively. For example, if a highlight depicts a goal, the highlight may be extended (via an end offset) for a few seconds so as to include celebrations and/or fan reactions following the goal. Offsets can be configured to vary automatically or manually, based for example on amount of time available for the highlight, importance and/or excitement level of the highlight, and/or any other suitable factors.

String: A series of occurrences that are somehow linked or related to one another. The occurrences may take place within a possession (defined below), or may span multiple possessions. The occurrences may take place within a sequence (defined below), or may span multiple sequences. The occurrences can be linked or related because of some thematic or narrative connection to one another, or because one leads to another, or for any other reason. One example of a string is a set of passes that lead to a goal or basket. This is not to be confused with a "text string," which has the meaning ordinarily ascribed to it in the computer programming arts.

Possession: Any time-delimited portion of an event. Demarcation of start/end times of a possession can depend on the type of event. For certain sporting events wherein one team may be on the offensive while the other team is on the defensive (such as basketball or football, for example), a possession can be defined as a time period while one of the teams has the ball. In sports such as hockey or soccer, where puck or ball possession is more fluid, a possession can be considered to extend to a period of time wherein one of the teams has substantial control of the puck or ball, ignoring momentary contact by the other team (such as blocked shots or saves). For baseball, a possession is defined as a half-inning. For football, a possession can include a number of sequences in which the same team has the ball. For other types of sporting events as well as for non-sporting events, the term "possession" may be somewhat of a misnomer, but is still used herein for illustrative purposes. Examples in a non-sporting context may include a chapter, scene, act, television segment, or the like. For example, in the context of a music concert, a possession may equate to performance of a single song. A possession can include any number of occurrences.

Sequence: A time-delimited portion of an event that includes one continuous time period of action. For example, in a sporting event, a sequence may begin when action begins (such as a face-off, tipoff, or the like), and may end when the whistle is blown to signify a break in the action. In a sport such as baseball or football, a sequence may be equivalent to a play, which is a form of occurrence. A sequence can include any number of possessions, or may be a portion of a possession.

Highlight show: A set of highlights that are arranged for presentation to a user. The highlight show may be presented linearly (such as a video stream), or in a manner that allows the user to select which highlight to view and in which order (for example by clicking on links or thumbnails). Presentation of highlight show can be non-interactive or interactive, for example allowing a user to pause, rewind, skip, fast-forward, communicate a preference for or against, and/or the like. A highlight show can be, for example, a condensed game. A highlight show can include any number of contiguous or non-contiguous highlights, from a single event or from multiple events, and can even include highlights from different types of events (e.g. different sports, and/or a combination of highlights from sporting and non-sporting events).

User/viewer: The terms "user" or "viewer" interchangeably refer to an individual, group, or other entity that is watching, listening to, or otherwise experiencing an event, one or more highlights of an event, or a highlight show. The terms "user" or "viewer" can also refer to an individual, group, or other entity that may at some future time watch, listen to, or otherwise experience either an event, one or more highlights of an event, or a highlight show. The term "viewer" may be used for descriptive purposes, although the event need not have a visual component, so that the "viewer" may instead be a listener or any other consumer of content.

Narrative: A coherent story that links a set of highlight segments in a particular order.

Excitement level: A measure of how exciting or interesting an event or highlight is expected to be for a particular user or for users in general. Excitement levels can also be determined with respect to a particular occurrence or player. Various techniques for measuring or assessing excitement level are discussed in the above-referenced related applications. As discussed, excitement level can depend on occurrences within the event, as well as other factors such as overall context or importance of the event (playoff game, pennant implications, rivalries, and/or the like). In at least one embodiment, an excitement level can be associated with each occurrence, string, possession, or sequence within an event. For example, an excitement level for a possession can be determined based on occurrences that take place within that possession. Excitement level may be measured differently for different users (e.g. a fan of one team vs. a neutral fan), and it can depend on personal characteristics of each user.

Metadata: Data pertaining to and stored in association with other data. The primary data may be media such as a sports program or highlight.

Card Image: An image in a video frame that provides data regarding anything depicted in the video, such as an event, a depiction of an event, or a portion thereof. Exemplary card images contain game scores, game clocks, and/or other statistics from sporting events. Card images may appear temporarily or for the full duration of a video stream; those that appear temporarily may pertain particularly to the portion of a video stream in which they appear. A "card image" may also be a modified or processed version of the actual card image that appears in a video frame.

Character Image: A portion of an image that is believed to pertain to a single character. The character image may include the region surrounding the character. For example, a character image may include a generally rectangular bounding box surrounding a character.

Character: A symbol that can be part of a word, number, or representation of a word or number. Characters can include letters, numbers, and special characters, and may be in any language.

Character String: A set of characters that is grouped together in a manner indicating that they pertain to a single piece of information, such as the name of the team playing in a sporting event. An English language character string will often be arranged horizontally and read left-to-right. However, character strings may be arranged differently in English and in other languages.

Video Frame Region: A portion of a video frame believed to contain a card image, either based on knowledge of a predetermined location at which the card image is expected to appear within the video frame, or based on sequential analysis of multiple regions of the video frame to identify which region is likely to contain the card image.

Overview

According to various embodiments, methods and systems are provided for automatically creating time-based metadata associated with highlights of television programming of a sporting event. The highlights and associated in-frame time-based information may be extracted synchronously with respect to the television broadcast of a sporting event, or while the sporting event video content is being streamed via a video server from a backup device after the television broadcast of a sporting event.

In at least one embodiment, a software application operates synchronously with playback and/or receipt of the television programming content to provide information metadata associated with content highlights. Such software can run, for example, on the television device itself, or on an associated STB, or on a video server with the capability of receiving and subsequently streaming programming content, or on a mobile device equipped with the capability of receiving a video feed including live programming.

In video management and processing systems as well as in the context of an interactive (enhanced) programming guide, a set of video clips representing television broadcast content highlights can be automatically generated and/or stored in real-time, along with a database containing time-based metadata describing, in more detail, the events presented in the highlights. The metadata accompanying the video clips can include any information, such as for example textual information, images, and/or any type of audiovisual data. In this manner, interactive television applications can provide timely, relevant content to users who are watching programming content, either on a primary television display or on a secondary display such as tablet, laptop or a smartphone.

One type of metadata associated with in-game and post-game video content highlights carries real-time information about sporting game parameters extracted directly from live programming content by reading information cards ("card images") embedded in one or more of video frames of the programming content. In various embodiments, the system and method described herein enable this type of automatic metadata generation.

In at least one embodiment, the system and method automatically detect and localize card images embedded in one or more of decoded video frames of television broadcast of a sporting event program, or in a sporting event video streamed from a playback device. A multitude of predetermined regions of interest are analyzed in decoded video frames, and card image quadrilaterals are localized and processed in real-time using computer vision techniques to transform information from an identified card image into a set of metadata describing the status of the sporting event.

In another embodiment, an automated process is described, wherein a digital video stream is received, and wherein one or more video frames of the digital video stream are analyzed for the presence of card image quadrilaterals. Text boxes are then localized within the identified card image, and text residing within the said text boxes is interpreted to create a metadata file associating card image content with video highlights of the analyzed digital video stream.

In yet another embodiment, a plurality of text strings (text boxes) is identified, and the location and size of the image of each character in the string of characters associated with said text boxes are detected. Next, a plurality of text strings from various fields of the card image are processed and interpreted, and corresponding metadata are formed, providing a plurality of information related to the portion of the sporting event associated with the processed card image and analyzed video frames.

The automated metadata generation video system presented herein may operate in connection with a live broadcast video stream or a digital video streamed via a computer server. In at least one embodiment, the video stream can be processed in real-time using computer vision techniques to extract metadata from embedded card images.

System Architecture

According to various embodiments, the system can be implemented on any electronic device, or set of electronic devices, equipped to receive, store, and present information. Such an electronic device may be, for example, a desktop computer, laptop computer, television, smartphone, tablet, music player, audio device, kiosk, set-top box (STB), game system, wearable device, consumer electronic device, and/or the like.

Although the system is described herein in connection with an implementation in particular types of computing devices, one skilled in the art will recognize that the techniques described herein can be implemented in other contexts, and indeed in any suitable device capable of receiving and/or processing user input, and presenting output to the user. Accordingly, the following description is intended to illustrate various embodiments by way of example, rather than to limit scope.

Referring now to FIG. 1A, there is shown a block diagram depicting hardware architecture of a system 100 for automatically extracting metadata from card images embedded in a video stream of an event, according to a client/server embodiment. Event content, such as the video stream, may be provided via a network-connected content provider 124. An example of such a client/server embodiment is a web-based implementation, wherein each of one or more client devices 106 runs a browser or app that provides a user interface for interacting with content from various servers 102, 114, 116, including data provider(s) servers 122, and/or content provider(s) servers 124, via communications network 104. Transmission of content and/or data in response to requests from client device 106 can take place using any known protocols and languages, such as Hypertext Markup Language (HTML), Java, Objective C, Python, JavaScript, and/or the like.

Client device 106 can be any electronic device, such as a desktop computer, laptop computer, television, smartphone, tablet, music player, audio device, kiosk, set-top box, game system, wearable device, consumer electronic device, and/or the like. In at least one embodiment, client device 106 has a number of hardware components well known to those skilled in the art. Input device(s) 151 can be any component(s) that receive input from user 150, including, for example, a handheld remote control, keyboard, mouse, stylus, touchsensitive screen (touchscreen), touchpad, gesture receptor, trackball, accelerometer, five-way switch, microphone, or the like. Input can be provided via any suitable mode, including for example, one or more of: pointing, tapping, typing, dragging, gesturing, tilting, shaking, and/or speech. Display screen 152 can be any component that graphically displays information, video, content, and/or the like, including depictions of events, highlights, and/or the like. Such output may also include, for example, audiovisual content, data visualizations, navigational elements, graphical elements, queries requesting information and/or parameters for selection of content, or the like. In at least one embodiment, where only some of the desired output is presented at a time, a dynamic control, such as a scrolling mechanism, may be available via input device(s) 151 to choose which information is currently displayed, and/or to alter the manner in which the information is displayed.

Processor 157 can be a conventional microprocessor for performing operations on data under the direction of software, according to well-known techniques. Memory 156 can be random-access memory, having a structure and architecture as are known in the art, for use by processor 157 in the course of running software for performing the operations described herein. Client device 106 can also include local storage (not shown), which may be a hard drive, flash drive, optical or magnetic storage device, web-based (cloud-based) storage, and/or the like.

Any suitable type of communications network 104, such as the Internet, a television network, a cable network, a cellular network, and/or the like can be used as the mechanism for transmitting data between client device 106 and various server(s) 102, 114, 116 and/or content provider(s) 124 and/or data provider(s) 122, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 106 transmits requests for data and/or content via communications network 104, and receives responses from server(s) 102, 114, 116 containing the requested data and/or content.

In at least one embodiment, the system of FIG. 1A operates in connection with sporting events; however, the teachings herein apply to non-sporting events as well, and it is to be appreciated that the technology described herein is not limited to application to sporting events. For example, the technology described herein can be utilized to operate in connection with a television show, movie, news event, game show, political action, business show, drama, and/or other episodic content, or for more than one such event.

In at least one embodiment, system 100 identifies highlights of broadcast events by analyzing a video stream of the event. This analysis may be carried out in real-time. In at least one embodiment, system 100 includes one or more web server(s) 102 coupled via a communications network 104 to one or more client devices 106. Communications network 104 may be a public network, a private network, or a combination of public and private networks such as the Internet. Communications network 104 can be a LAN, WAN, wired, wireless and/or combination of the above. Client device 106 is, in at least one embodiment, capable of connecting to communications network 104, either via a wired or wireless connection. In at least one embodiment, client device may also include a recording device capable of receiving and recording events, such as a DVR, PVR, or other media recording device. Such recording device can be part of client device 106, or can be external; in other embodiments, such recording device can be omitted. Although FIG. 1A shows one client device 106, system 100 can be implemented with any number of client device(s) 106 of a single type or multiple types.

Web server(s) 102 may include one or more physical computing devices and/or software that can receive requests from client device(s) 106 and respond to those requests with data, as well as send out unsolicited alerts and other messages. Web server(s) 102 may employ various strategies for fault tolerance and scalability such as load balancing, caching and clustering. In at least one embodiment, web server(s) 102 may include caching technology, as known in the art, for storing client requests and information related to events.

Web server(s) 102 may maintain, or otherwise designate, one or more application server(s) 114 to respond to requests received from client device(s) 106. In at least one embodiment, application server(s) 114 provide access to business logic for use by client application programs in client device(s) 106. Application server(s) 114 may be co-located, co-owned, or co-managed with web server(s) 102. Application server(s) 114 may also be remote from web server(s) 102. In at least one embodiment, application server(s) 114 interact with one or more analytical server(s) 116 and one or more data server(s) 118 to perform one or more operations of the disclosed technology.

One or more storage devices 153 may act as a "data store" by storing data pertinent to operation of system 100. This data may include, for example, and not by way of limitation, card data 154 pertinent to card images embedded in video streams presenting events such as sporting events, user data 155 pertinent to one or more users 150, and/or highlight data 164 pertinent to one or more highlights of the events.

Card data 154 can include any information related to card images embedded in the video stream, such as the card images themselves, subsets thereof such as character images, text extracted from the card images such as characters and character strings, and attributes of any of the foregoing that can be helpful in text and/or meaning extraction. User data 155 can include any information describing one or more users 150, including for example, demographics, purchasing behavior, video stream viewing behavior, interests, preferences, and/or the like. Highlight data 164 may include highlights, highlight identifiers, time indicators, categories, excitement levels, and other data pertaining to highlights. Card data 154, user data 155, and highlight data 164 will be described in detail subsequently.

Notably, many components of system 100 may be, or may include, computing devices. Such computing devices may each have an architecture similar to that of client device 106, as shown and described above. Thus, any of communications network 104, web servers 102, application servers 114, analytical servers 116, data providers 122, content providers 124, data servers 118, and storage devices 153 may include one or more computing devices, each of which may optionally have an input device 151, display screen 152, memory 156, and/or a processor 157, as described above in connection with client devices 106.

In an exemplary operation of system 100, one or more users 150 of client devices 106 view content from content providers 124, in the form of video streams. The video streams may show events, such as sporting events. The video streams may be digital video streams that can readily be processed with known computer vision techniques.

As the video streams are displayed, one or more components of system 100, such as client devices 106, web servers 102, application servers 114, and/or analytical servers 116, may analyze the video streams, identify highlights within the video streams, and/or extract metadata from the video stream, for example, from embedded card images and/or other aspects of the video stream. This analysis may be carried out in response to receipt of a request to identify highlights and/or metadata for the video stream. Alternatively, in another embodiment, highlights may be identified without a specific request having been made by user 150. In yet another embodiment, the analysis of video streams can take place without a video stream being displayed.

In at least one embodiment, user 150 can specify, via input device(s) 151 at client device 106, certain parameters for analysis of the video stream (such as, for example, what event/games/teams to include, how much time user 150 has available to view the highlights, what metadata is desired, and/or any other parameters). User preferences can also be extracted from storage, such as from user data 155 stored in one or more storage devices 153, so as to customize analysis of the video stream without necessarily requiring user 150 to specify preferences. In at least one embodiment, user preferences can be determined based on observed behavior and actions of user 150, for example, by observing website visitation patterns, television watching patterns, music listening patterns, online purchases, previous highlight identification parameters, highlights and/or metadata actually viewed by user 150, and/or the like.

Additionally or alternatively, user preferences can be retrieved from previously stored preferences that were explicitly provided by user 150. Such user preferences may indicate which teams, sports, players, and/or types of events are of interest to user 150, and/or they may indicate what type of metadata or other information related to highlights, would be of interest to user 150. Such preferences can therefore be used to guide analysis of the video stream to identify highlights and/or extract metadata for the highlights.

Analytical server(s) 116, which may include one or more computing devices as described above, may analyze live and/or recorded feeds of play-by-play statistics related to one or more events from data provider(s) 122. Examples of data provider(s) 122 may include, but are not limited to, providers of real-time sports information such as STATS™, Perform (available from Opta Sports of London, UK), and SportRadar of St. Gallen, Switzerland. In at least one embodiment, analytical server(s) 116 generate different sets of excitement levels for events; such excitement levels can then be stored in conjunction with highlights identified by system 100 according to the techniques described herein.

Application server(s) 114 may analyze the video stream to identify the highlights and/or extract the metadata. Additionally or alternatively, such analysis may be carried out by client device(s) 106. The identified highlights and/or extracted metadata may be specific to a user 150; in such case, it may be advantageous to identify the highlights in client device 106 pertaining to a particular user 150. Client device 106 may receive, retain, and/or retrieve the applicable user preferences for highlight identification and/or metadata extraction, as described above. Additionally or alternatively, highlight generation and/or metadata extraction may carried out globally (i.e., using objective criteria applicable to the user population in general, without regard to preferences for a particular user 150). In such a case, it may be advantageous to identify the highlights and/or extract the metadata in application server(s) 114.

Content that facilitates highlight identification and/or metadata extraction may come from any suitable source, including from content provider(s) 124, which may include websites such as YouTube, MLB.com, and the like; sports data providers; television stations; client- or server-based DVRs; and/or the like. Alternatively, content can come from a local source such as a DVR or other recording device associated with (or built into) client device 106. In at least one embodiment, application server(s) 114 generate a customized highlight show, with highlights and metadata, available to user 150, either as a download, or streaming content, or on-demand content, or in some other manner.

As mentioned above, it may be advantageous for user-specific highlight identification and/or metadata extraction to be carried out at a particular client device 106 associated with a particular user 150. Such an embodiment may avoid the need for video content or other high-bandwidth content to be transmitted via communications network 104 unnecessarily, particularly if such content is already available at client device 106.

Figure 1B:
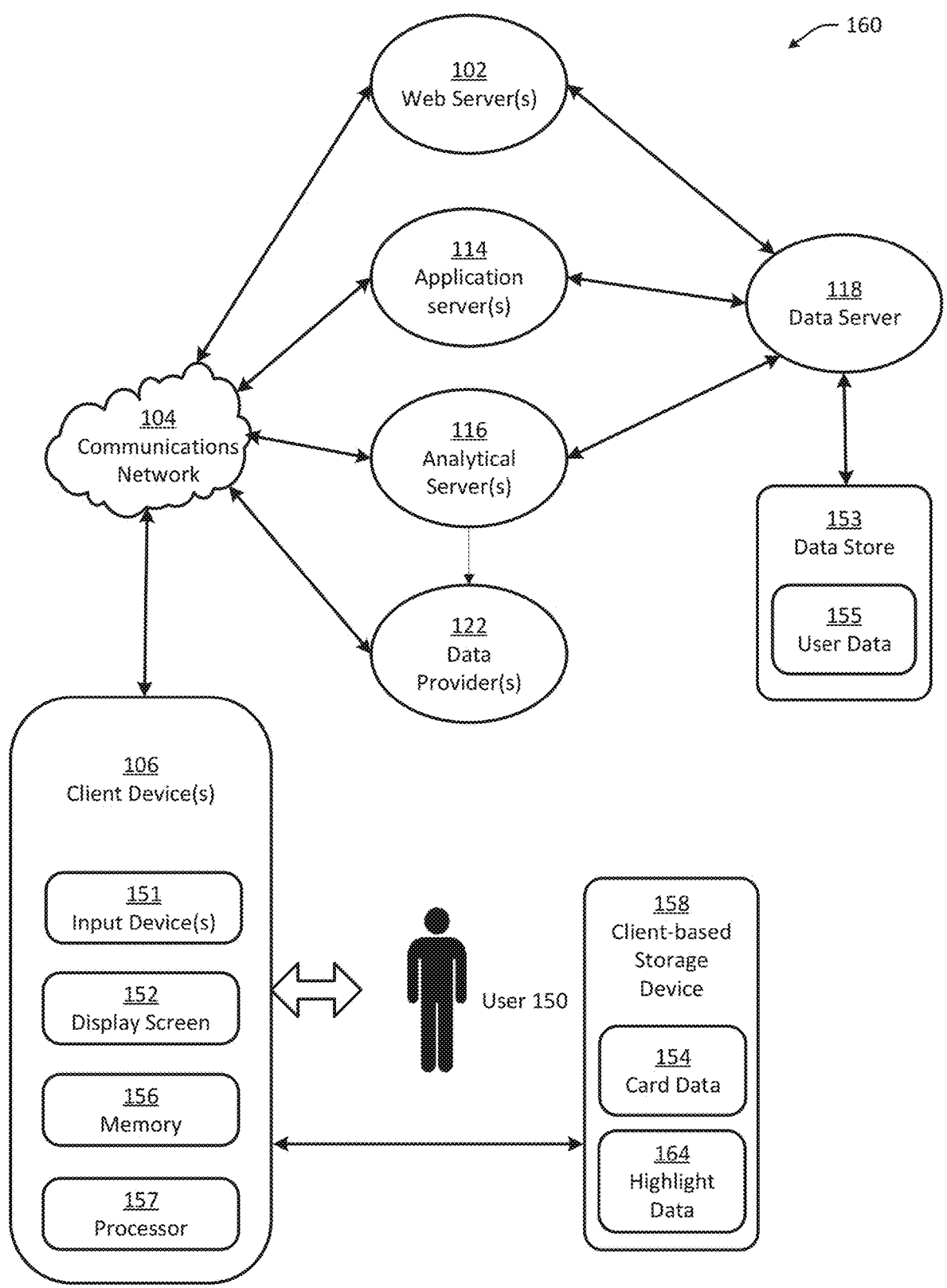
FIG. 1B is a block diagram depicting a hardware architecture according to another client/server embodiment, wherein event content is stored at a client-based storage device.

For example, referring now to FIG. 1B, there is shown an example of a system 160 according to an embodiment wherein at least some of the card data 154 and highlight data 164 are stored at client-based storage device 158, which may be any form of local storage device available to client device 106. An example is a DVR on which events may be recorded, such as for example video content for a complete sporting event. Alternatively, client-based storage device 158 can be any magnetic, optical, or electronic storage device for data in digital form; examples include flash memory, magnetic hard drive, CD-ROM, DVD-ROM, or other device integrated with client device 106 or communicatively coupled with client device 106. Based on the information provided by application server(s) 114, client device 106 may extract metadata from card data 154 stored at client-based storage device 158 and store the metadata as highlight data 164 without having to retrieve other content from a content provider 124 or other remote source. Such an arrangement can save bandwidth, and can usefully leverage existing hardware that may already be available to client device 106.

Returning to FIG. 1A, in at least one embodiment, application server(s) 114 may identify different highlights and/or extract different metadata for different users 150, depending on individual user preferences and/or other parameters. The identified highlights and/or extracted metadata may be presented to user 150 via any suitable output device, such as display screen 152 at client device 106. If desired, multiple highlights may be identified and compiled into a highlight show, along with associated metadata. Such a highlight show may be accessed via a menu, and/or assembled into a "highlight reel," or set of highlights, that plays for user 150 according to a predetermined sequence. User 150 can, in at least one embodiment, control highlight playback and/or delivery of the associated metadata via input device(s) 151, for example to:

select particular highlights and/or metadata for display;
 pause, rewind, fast-forward;
 skip forward to the next highlight;
 return to the beginning of a previous highlight within the highlight show; and/or
 perform other actions.

Additional details on such functionality are provided in the above-cited related U.S. Patent Applications.

In at least one embodiment, one more data server(s) 118 are provided. Data server(s) 118 may respond to requests for data from any of server(s) 102, 114, 116, for example to obtain or provide card data 154, user data 155, and/or highlight data 164. In at least one embodiment, such information can be stored at any suitable storage device 153 accessible by data server 118, and can come from any suitable source, such as from client device 106 itself, content provider(s) 124, data provider(s) 122, and/or the like.

Figure 1C:
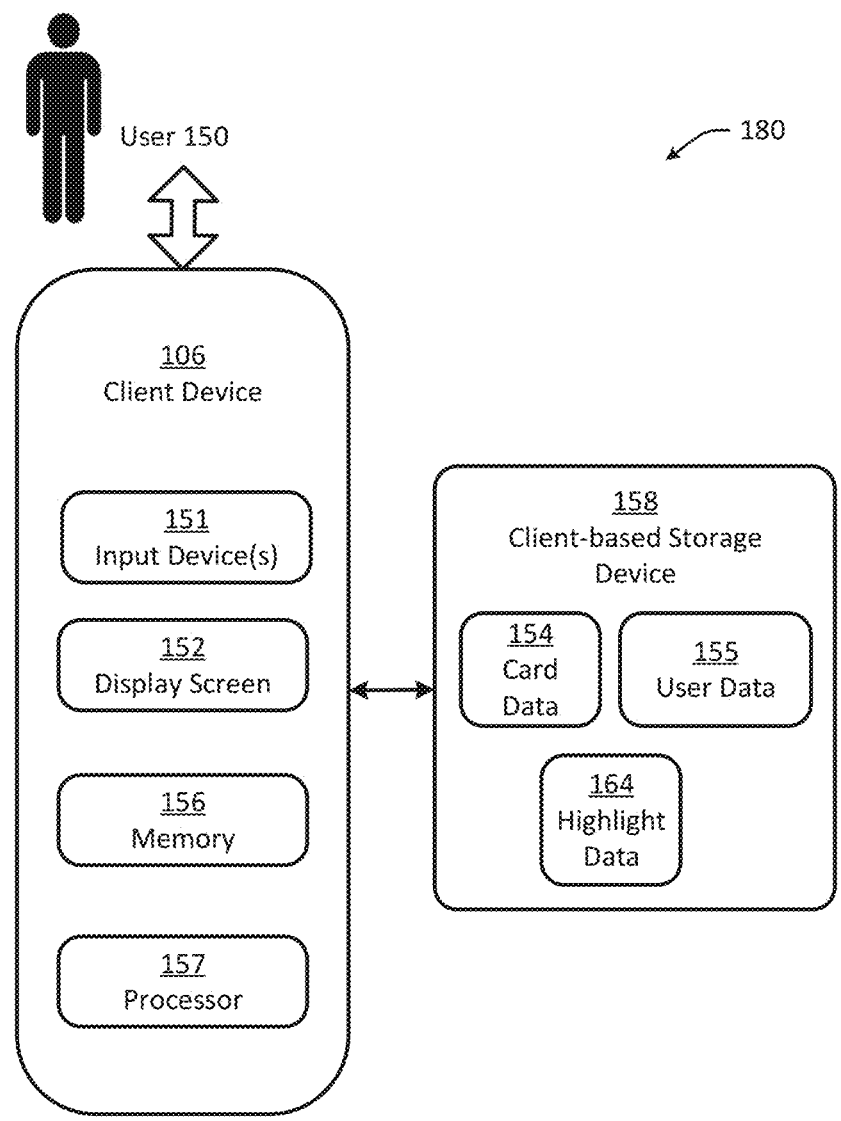
FIG. 1C is a block diagram depicting a hardware architecture according to a standalone embodiment.

Referring now to FIG. 1C, there is shown a system 180 according to an alternative embodiment wherein system 180 is implemented in a stand-alone environment. As with the embodiment shown in FIG. 1B, at least some of the card data 154, user data 155, and highlight data 164 may be stored at a client-based storage device 158, such as a DVR or the like. Alternatively, client-based storage device 158 can be flash memory or a hard drive, or other device integrated with client device 106 or communicatively coupled with client device 106.

User data 155 may include preferences and interests of user 150. Based on such user data 155, system 180 may extract metadata within card data 154 to present to user 150 in the manner described herein. Additionally or alternatively, metadata may be extracted based on objective criteria that are not based on information specific to user 150.

Figure 1D:
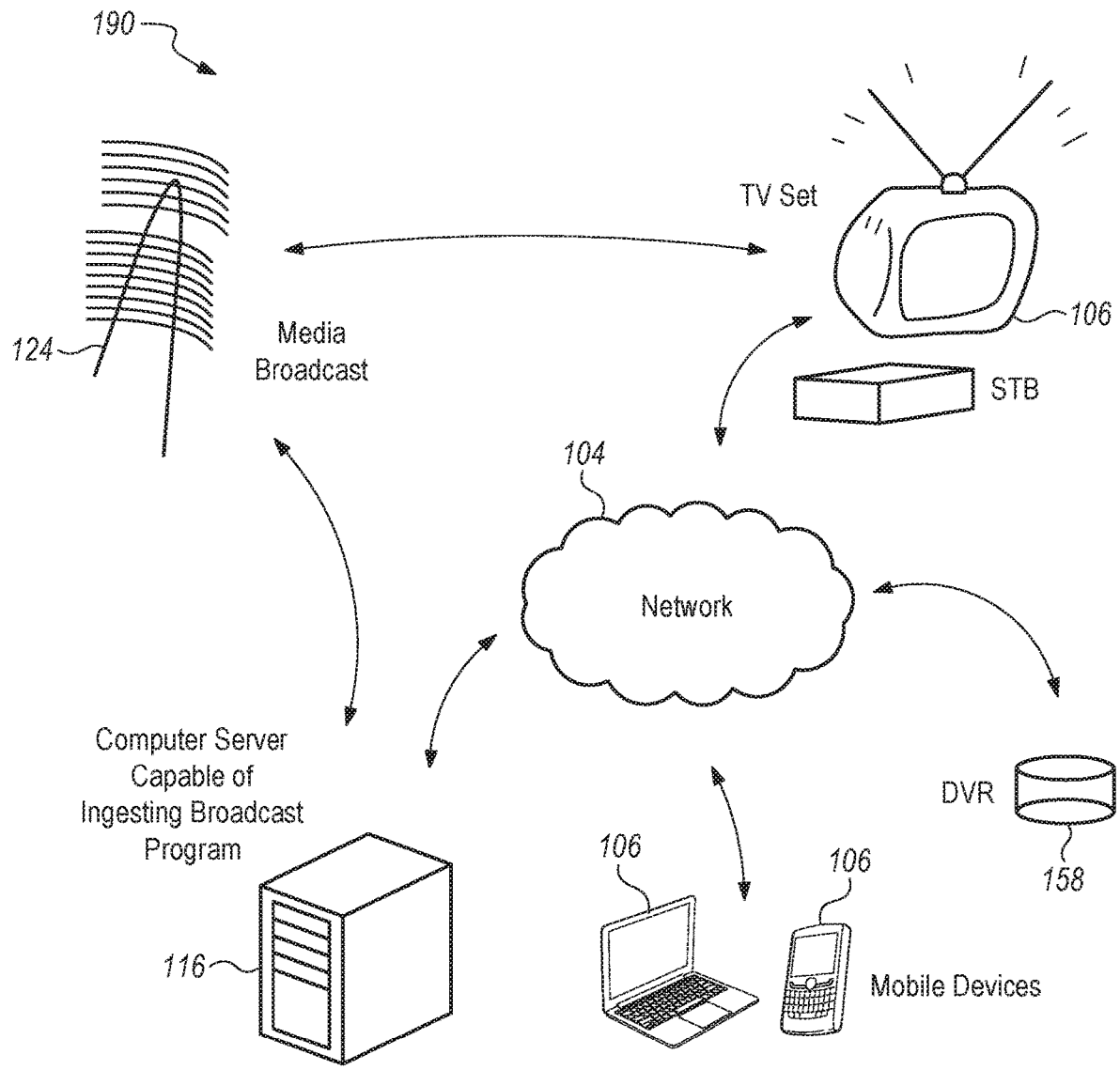
FIG. 1D is a block diagram depicting an overview of a system architecture, according to one embodiment.

Referring now to FIG. 1D, there is shown an overview of a system 190 with architecture according to an alternative embodiment. In FIG. 1D, system 190 includes a broadcast service such as content provider(s) 124, a content receiver in the form of client device 106 such as a television set with a STB, a video server such as analytical server(s) 116 capable of ingesting and streaming television programming content, and/or other client devices 106 such as a mobile device and a laptop, which are capable of receiving and processing television programming content, all connected via a network such as communications network 104. A client-based storage device 158, such as a DVR, may be connected to any of client devices 106 and/or other components, and may store a video stream, highlights, highlight identifiers, and/or metadata to facilitate identification and presentation of highlights and/or extracted metadata via any of client devices 106.

The specific hardware architectures depicted in FIGS. 1A, 1B, 1C, and 1D are merely exemplary. One skilled in the art will recognize that the techniques described herein can be implemented using other architectures. Many components depicted therein are optional and may be omitted, consolidated with other components, and/or replaced with other components.

In at least one embodiment, the system can be implemented as software written in any suitable computer programming language, whether in a standalone or client/server architecture. Alternatively, it may be implemented and/or embedded in hardware.

Data Structures

Figure 2:
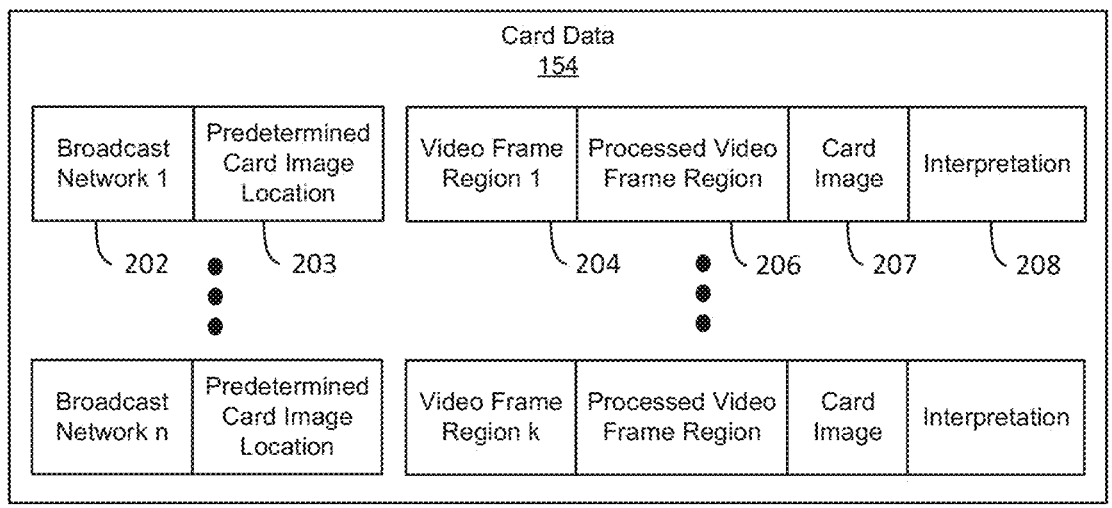
FIG. 2 is a schematic block diagram depicting examples of data structures that may be incorporated into the card images, user data, and highlight data, according to one embodiment.
Figure 2:
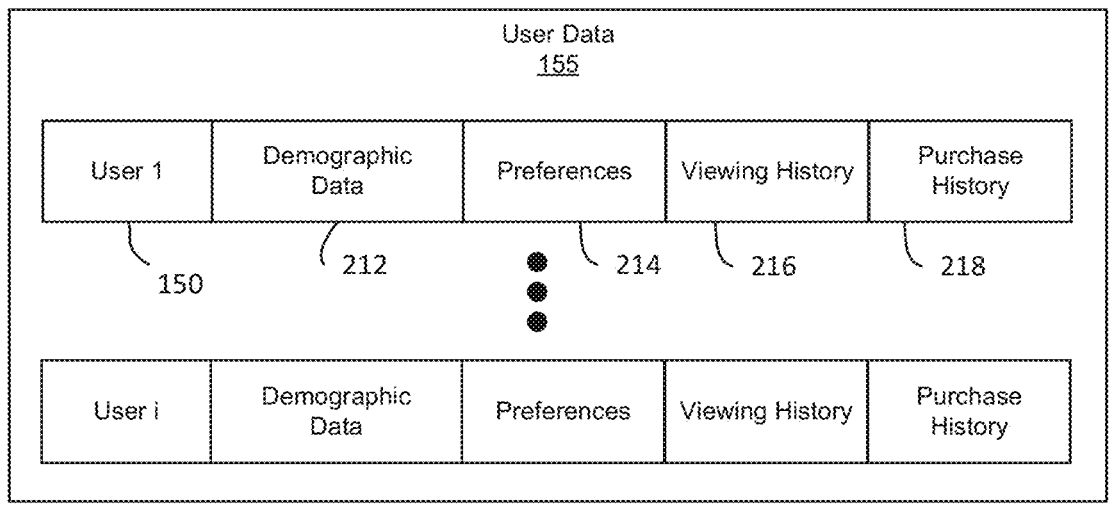
Figure 2:
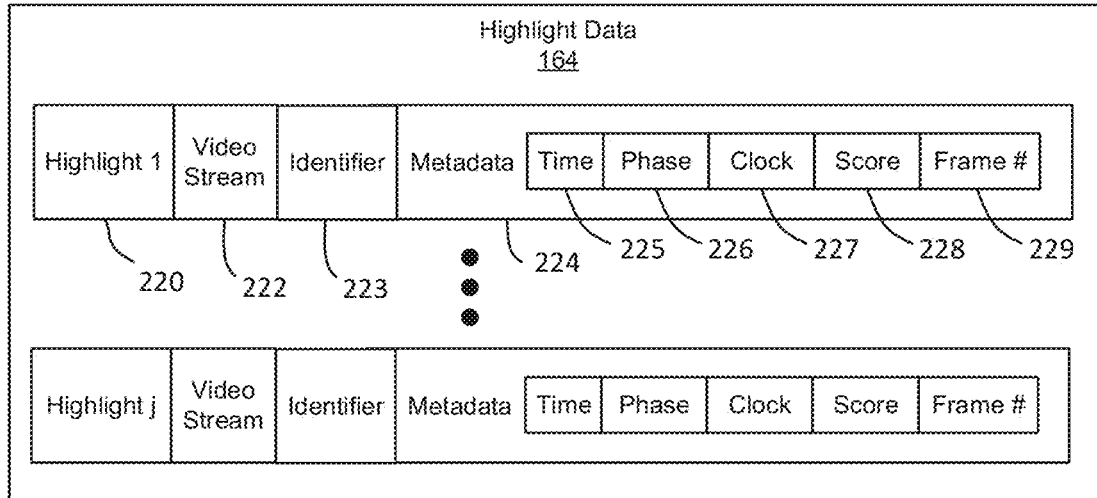

FIG. 2 is a schematic block diagram depicting examples of data structures that may be incorporated into card data 154, user data 155, and highlight data 164, according to one embodiment.

As shown, card data 154 may include a record for each of a plurality of broadcast networks 202. For example, for each of the broadcast networks 202, card data 154 may include a predetermined card location 203 at which the broadcast network typically displays card images within a video frame. The predetermined card locations may, for example, be represented as coordinates (such as Cartesian coordinates) identifying opposite corners of the location, identifying the center, height, and width, and/or otherwise identifying the location and/or size of the card image.

Further, card data 154 may include one or more video frame regions 204 that have been, or are to be, analyzed for card image extraction and interpretation. Each video frame region 204 may be extracted from a video frame of the video stream.

For each video frame region 204, card data 154 may also include one or more processed video frame regions 206, which may be generated by modifying video frame region 204 in a manner that facilitates identification and/or extraction of a card image 207. For example, processed video frame regions 206 may include one or more cropped, re-colored, segmented, augmented, or otherwise modified versions of each video frame region 204.

Each video frame region 204 may also have a card image 207 that has been identified within and/or extracted from video frame region 204. Each card image 207 may contain text that can be interpreted to provide metadata related to a specific time in a video stream.

Card data 154 may also include one or more interpretations 208 for each video frame region 204. Each interpretation 208 may be the specific text believed to be represented in associated card image 207 after some analysis has been performed to recognize and interpret characters appearing in card image 207. Interpretation 208 may be used to obtain the metadata from card image 207.

As further shown, user data 155 may include records pertaining to users 150, each of which may include demographic data 212, preferences 214, viewing history 216, and purchase history 218 for a particular user 150.

Demographic data 212 may include any type of demographic data, including but not limited to age, gender, location, nationality, religious affiliation, education level, and/or the like.

Preferences 214 may include selections made by user 150 regarding his or her preferences. Preferences 214 may relate directly to highlight and metadata gathering and/or viewing, or may be more general in nature. In either case, preferences 214 may be used to facilitate identification and/or presentation of the highlights and metadata to user 150.

Viewing history 216 may list the television programs, video streams, highlights, web pages, search queries, sporting events, and/or other content retrieved and/or viewed by user 150.

Purchase history 218 may list products or services purchased or requested by user 150.

As further shown, highlight data 164 may include records for j highlights 220, each of which may include a video stream 222, an identifier, and/or metadata 224 for a particular highlight 220.

Video stream 222 may include video depicting highlight 220, which may be obtained from one or more video streams of one or more events (for example, by cropping the video stream to include only video stream 222 pertaining to highlight 220). Identifier 223 may include time codes and/or other indicia that indicate where highlight 220 resides within the video stream of the event from which it is obtained.

In some embodiments, the record for each of highlights 220 may contain only one of video stream 222 and identifier 223. Highlight playback may be carried out by playing video stream 222 for user 150, or by using identifier 223 to play only the highlighted portion of the video stream for the event from which highlight 220 is obtained.

Metadata 224 may include information about highlight 220, such as the event date, season, and groups or individuals involved in the event or the video stream from which highlight 220 was obtained, such as teams, players, coaches, anchors, broadcasters, and fans, and/or the like. Among other information, metadata 224 for each highlight 220 may include a time 225, phase 226, clock 227, score 228, and/or frame number 229.

Time 225 may be a time, within video stream 222, from which highlight 220 is obtained, or within video stream 222 pertaining to highlight 220, at which metadata is available. In some examples, time 225 may be the playback time, within video stream 222, pertaining to highlight 220, at which a card image 207 is displayed containing metadata 224.

Phase 226 may be the phase of the event pertaining to highlight 220. More particularly, phase 226 may be the stage of a sporting event at which card image 207 is displayed containing metadata 224. For example, phase 226 may be "third quarter," "second inning," "bottom half," or the like.

Clock 227 may be the game clock pertaining to highlight 220. More particularly, clock 227 may be state of the game clock at the time card image 207 is displayed containing metadata 224. For example, clock 227 may be "15:47" for a card image 207 displayed with fifteen minutes and forty-seven seconds displayed on the game clock.

Score 228 may be the game score pertaining to highlight 220. More particularly, score 228 may be the score when card image 207 is displayed containing metadata 224. For example, score 228 may be "45-38," "7-0," "30-love," or the like.

Frame number 229 may be the number of the video frame, within the video stream from which highlight 220 is obtained, or video stream 222 pertaining to highlight 220, that relates most directly to highlight 220. More particularly, frame number 229 may be the number of such a video frame at which card image 207 is displayed containing metadata 224.

The data structures set forth in FIG. 2 are merely exemplary. Those of skill in the art will recognize that some of the data of FIG. 2 may be omitted or replaced with other data in the performance of highlight identification and/or metadata extraction. Additionally or alternatively, data not shown in FIG. 2 may be used in the performance of highlight identification and/or metadata extraction.

Card Images

Figure 3A:
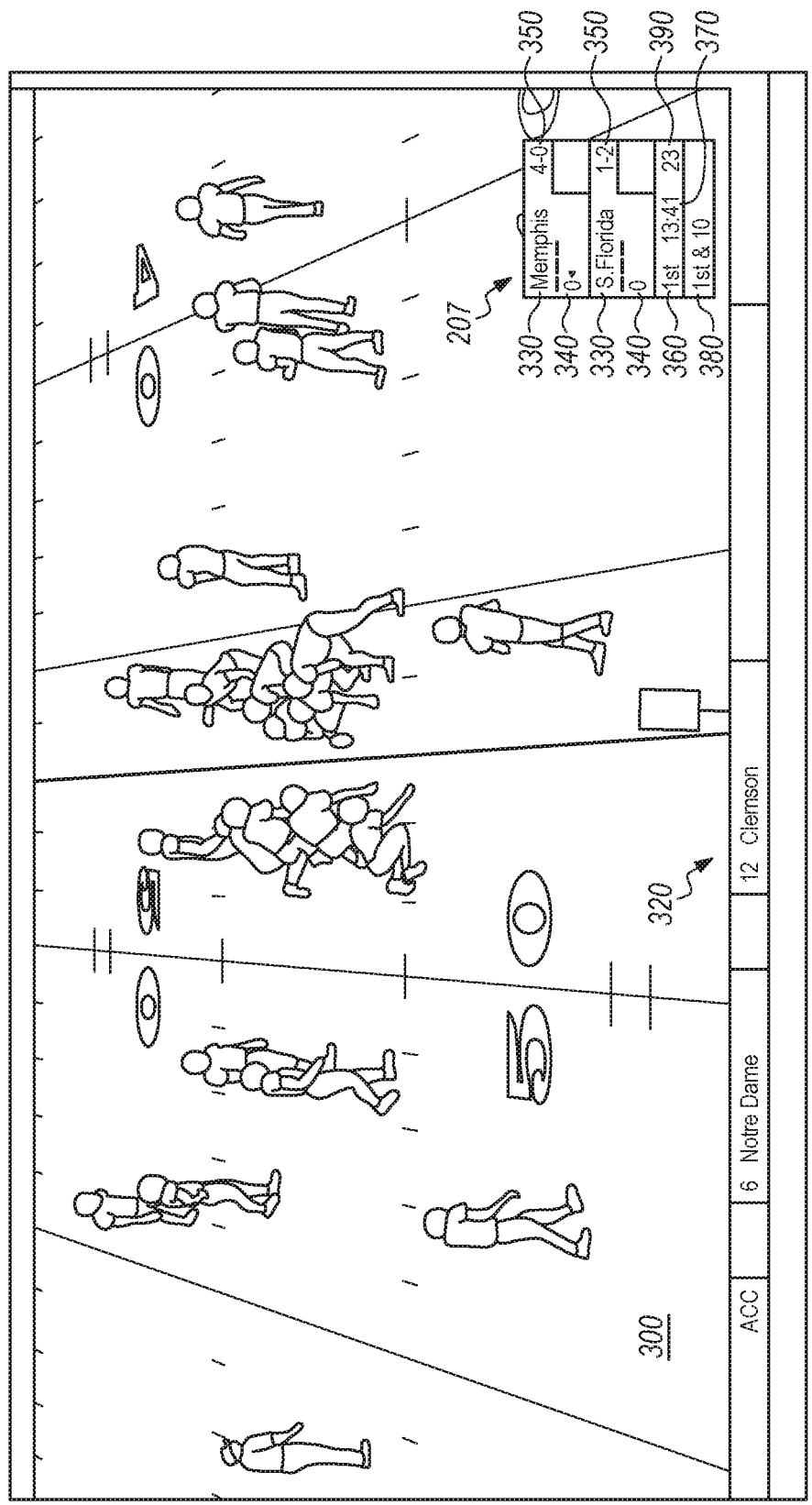
FIG. 3A is a screenshot diagram of an example of a video frame from a video stream, showing in-frame embedded information card images ("card images") as may be found in sporting event television programming contents.

Referring now to FIG. 3A, there is shown a screenshot diagram of an example of a video frame 300 from a video stream with embedded information in the form of card images 207, as may frequently appear in sporting event television programming. FIG. 3A depicts a card image 207 in the lower right-hand side of video frame 300, and a second card image 320 extending along the bottom of video frame 300. Card images 207, 320 may contain embedded information such as the game phase, current clocks, and current scores.

In at least one embodiment, the information in card images 207, 320 is localized and processed for automatic recognition and interpretation of embedded text in card images 207, 320. The interpreted text may then be assembled into textual metadata describing the status of the sporting game at particular point of time within the sporting event timeline.

Notably, card image 207 may pertain to the sporting event currently being shown, while second card image 320 may contain information for a different sporting event. In some embodiments, only card images containing information deemed to be pertinent to the currently playing sporting event is processed for metadata generation. Thus, without limiting scope, the exemplary description below assumes that only card image 207 will be processed. However, in alternative embodiments, it may be desirable to process multiple card images in a given video frame 300, even including card images pertaining to other sporting events.

As shown in FIG. 3A, card image 207 can provide several different types of metadata 224, including team names 330, scores 340, prior team performance 350, a current game stage 360, a game clock 370, a play status 380, and/or other information 390. Each of these may be extracted from within card image 207 and interpreted to provide metadata 224 corresponding to highlight 220 containing video frame 300, and more particularly, to video frame 300 in which card image 207 is displayed.

Figure 3B:
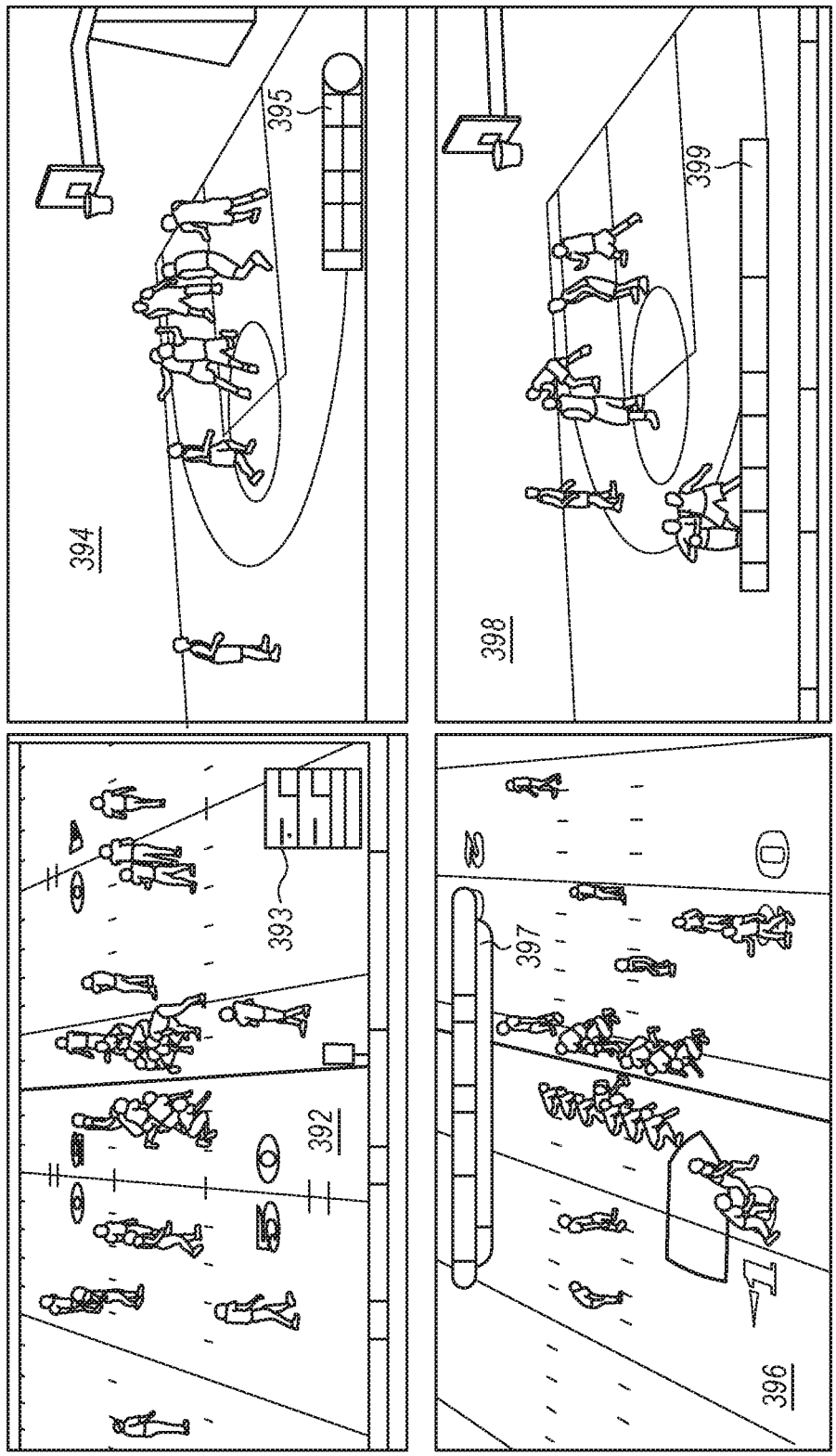
FIG. 3B is a series of screenshot diagrams depicting additional examples of video frames with embedded card images.

FIG. 3B is a series of screenshot diagrams depicting additional examples of video frames 392, 394, 396, 398 with embedded card images 393, 395, 397, 399, respectively, so as to illustrate additional examples of positions of embedded card images in sports television programming. Different television networks may have different types, shapes, and frame positions of such card images embedded in video frames of sporting event television programming content.

Card Image Localization and Extraction

Figure 4:
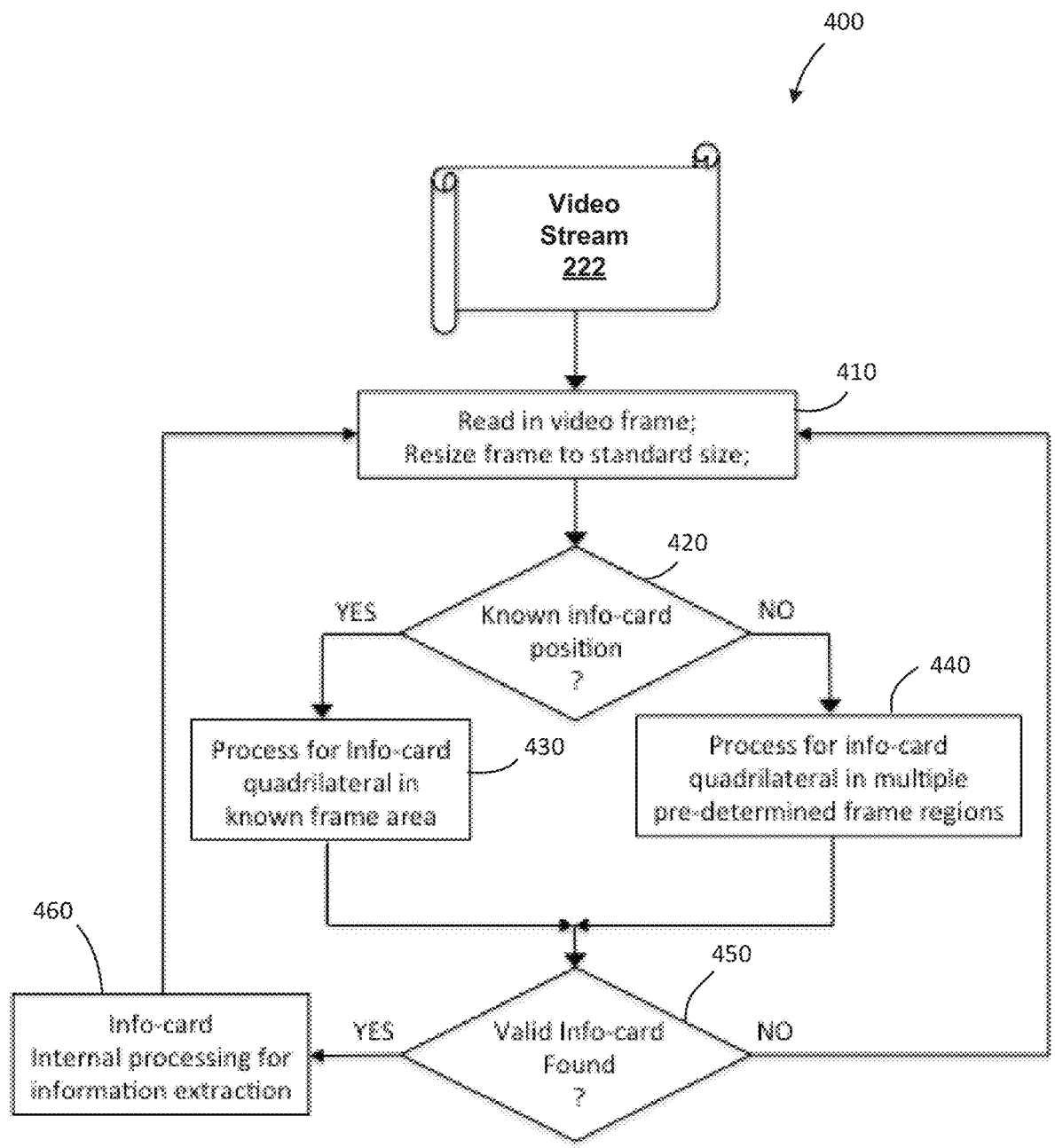
FIG. 4 is a flowchart depicting a method carried out by an application that receives a video stream and performs on-the-fly processing of video frames for localization and extraction of card images and associated metadata, such as the card image of FIG. 3 and its associated game status information, according to one embodiment.

FIG. 4 is a flowchart depicting a method 400 carried out by an application (for example, running on one of client devices 106 and/or analytical servers 116) that receives a video stream 222 and performs on-the-fly processing of video frames 300 for localization and extraction of card images 207 and associated metadata, such as card image 207 of FIG. 3 and its associated game status information, according to one embodiment. System 100 of FIG. 1A will be referenced as the system performing method 400 and those that follow; however, alternative systems, including but not limited to system 160 of FIG. 1B, system 180 of FIG. 1C, and system 190 of FIG. 1D, may be used in place of system 100 of FIG. 1A.

Method 400 of FIG. 4 may include receiving a video stream 222. In a step 410, one or more video frames 300 of video stream 222 may be read and decoded, for example, by resizing video frames 300 to a standard size. In a query 420, a step 430, a step 440, and/or a query 450, video frames 300 may be processed for in-frame card image localization. In a step 460, a detected card image 207 may be processed to extract information by reading and interpreting card image 207. Metadata 224 may be generated based in the information extracted from card image 207.

In at least one embodiment, the detection of one or more card images 207 present in a decoded video frame 300 is performed by analyzing a single predetermined frame area. Alternatively, such detection can be performed by analyzing multiple predetermined frame areas, if the approximate location of a card image 207 in decoded video frame 300 is not known in advance. Thus, query 420 may determine whether the position of card image 207, within video frame 300, is known. For example, some broadcasting networks may always show a card image 207 in the same position within video frame 300. If the broadcasting network is known, the position of card image 207 may also be known. In the alternative, the position of card image 207 within video frame 300 may not be known, and may need to be ascertained by system 100.

Pursuant to query 420, if the position of card image 207, within video frame 300, is known, method 400 may proceed to step 430 in which the known portion, or video frame region, may be processed to isolate the quadrilateral shape typically associated with a card image 207. If the position of the card image 207, within video frame 300, is not known, method 400 may proceed to step 440, in which video frame 300 is divided into a plurality of regions, which may be predetermined regions of video frame 300. The regions of video frame 300 are sequentially analyzed to determine which of the regions contains a card image similar to card images 207, 395, 397, and/or 399.

For example, the particular region(s) of video frame 300 containing card image 207 may be known for each of a variety of broadcasting networks. If the broadcasting network is not known, system 100 may sequentially proceed through each region of video frame 300 known to be used by a broadcasting network for display of card image 207, until card image 207 is located in one of the regions.

Pursuant to query 450, if card image 207 has been located, method 400 may proceed to step 460 in which card image 207 is processed and information is extracted from card image 207 to provide metadata 224. If, pursuant to query 450, card image 207 has not been located, method 400 may return to step 410, in which a new video frame may be loaded, decoded, and then analyzed for presence of a card image 207.

As mentioned previously, method 400 may, in some embodiments, be carried out in real-time, while user 150 is viewing the program (for example, while a video stream 222 corresponding to a highlight 220 is being presented). Thus, method 400 may be carried out in the background for each video frame 300 as video frame 300 is being decoded for playback for user 150. There may be some delay as system 100 localizes, extracts, and interprets card images 207. Thus, in this application, presenting metadata extracted from card images 207 is considered to be in "real-time" even if presentation of metadata 224 lags behind playback of video frame 300 from which it was obtained (for example, by a few video frames 300 amounting to a delay that is not perceptible or not distracting to user 150).

Figure 5:
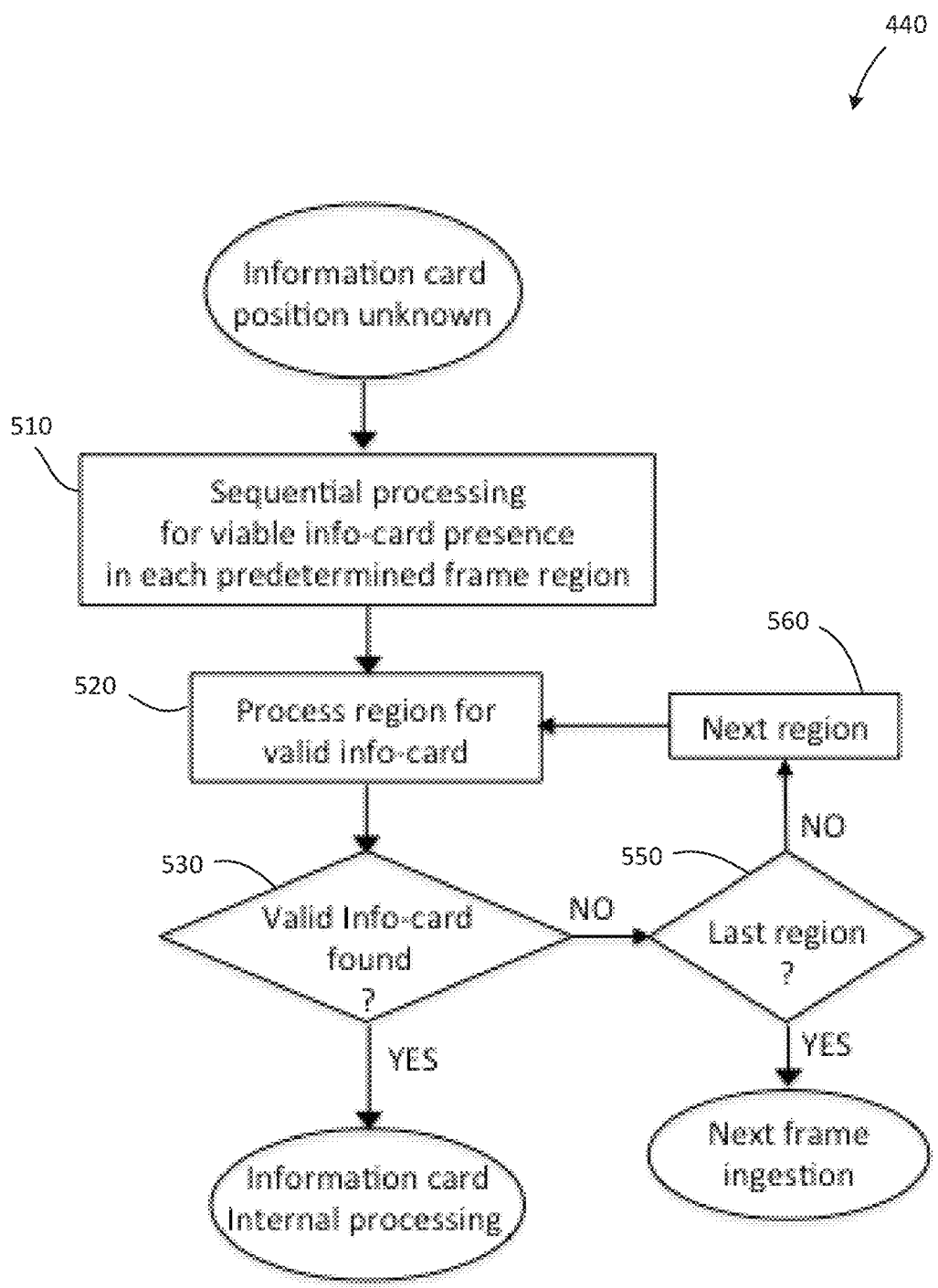
FIG. 5 is a flowchart depicting the step for processing of predetermined regions of a video frame for detection of a viable card image, from FIG. 4, in greater detail.

FIG. 5 is a flowchart depicting step 440 for processing of predetermined regions of a video frame 300 for detection of a viable card image 207, from FIG. 4, in greater detail. Each of the predetermined regions may present an approximate location where card image 207 may reside.

In at least one embodiment, the predetermined regions in decoded video frames 300 are generated based on the knowledge of approximate positions of card images 207 used by various television networks engaged in broadcasting of sporting event television programs, as indicated previously. Such television networks may be known to use one or more regions of video frame 300 for delivering in-frame visual and textual data via card images 207.

In a step 510, sequential processing of the regions may commence. In a step 520, one of the regions may be processed to ascertain whether a valid card image 207 is present in the region. A query 530 may determine whether a card image 207 has been found in the region. If so, the region may be further processed to extract card image 207. Localized card image 207 may be further processed for automatic recognition and interpretation of embedded text. Such interpreted text can then be further assembled into textual metadata describing the status of the sporting event (such as a game) at particular points of time on the sporting event timeline. In at least one embodiment, the available choices for text rendering are based on the type of card image 207 that has been detected in video frame 300, which may be determined by system 100 during localization and/or extraction of card image 207. Additionally or alternatively, the available choices for text rendering may be based on pre-assigned meanings of selected fields present within the particular type of card image 207 that has been detected.

If no card image 207 has been found in the region, a query 550 may ascertain whether the region is the last region in video frame 300. If not, system 100 may proceed, in a step 560, to the next region, and then repeat processing per step 520 for the next region. If the region is the last region in video frame 300, then video frame 300 may not contain a valid card image 207, and system 100 may proceed to next video frame 300.

Automatic Detection and Localization of Card Image Quadrilaterals

Figure 6:
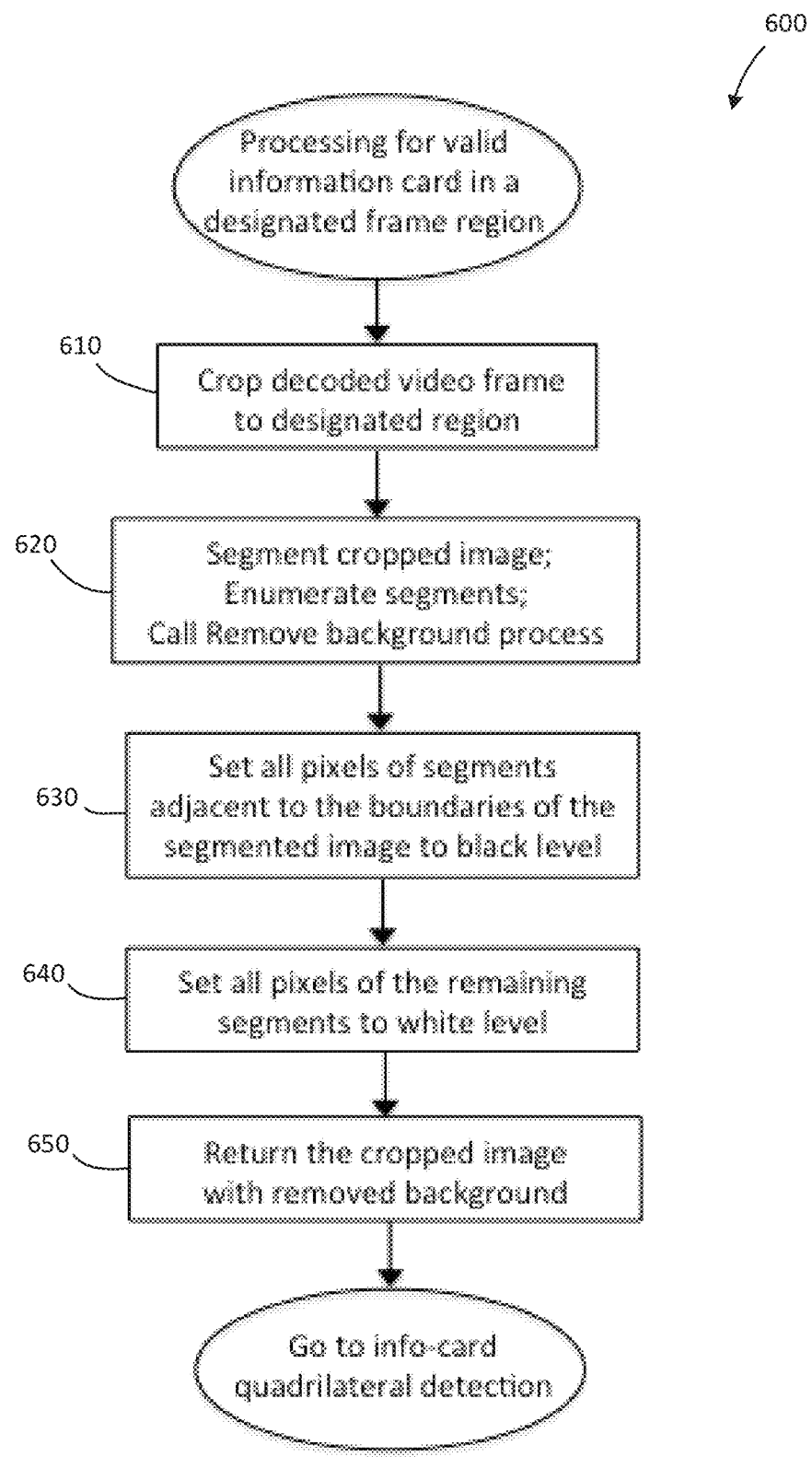
FIG. 6 is a flowchart depicting a method for top-level processing for valid card image quadrilateral detection in designated areas of decoded video frames, according to one embodiment.

FIG. 6 is a flowchart depicting a method 600 for top-level processing for valid card image quadrilateral detection in designated areas of decoded video frames 300, according to one embodiment. Method 600 may be performed on a video frame region at a predetermined location, pursuant to step 430 of FIG. 4, or to a video frame region that was identified via sequential processing of multiple regions of video frame 300 pursuant to step 440 of FIGS. 4 and 5.

First, in a step 610, a decoded video frame 300 may be cropped to a smaller area containing the designated video frame region, providing a cropped image. In a step 620, the cropped image may be segmented using any suitable segmentation algorithm, such as graph-based segmentation (e.g. "Efficient Graph-Based Image Segmentation, P. Felzenszwalb, D. Huttenlocher, Int. Journal of Computer Vision, 2004, Vol. 59), and all generated segments may be colorcoded and enumerated, providing a segmented image. Further processing of the segmented image may include removing background material surrounding a possible quadrilateral defining a card image 207. In at least one embodiment, method 600 may proceed to a step 630 in which all pixels of segments adjacent to the boundaries of the segmented cropped image are set to a black level. In a step 640, all pixels of the remaining inner segments of the segmented cropped image are set to a white level. In a step 650, the two-colored cropped image with partially removed background may be passed along for further processing for precise card image quadrilateral delineation.

Figure 7:
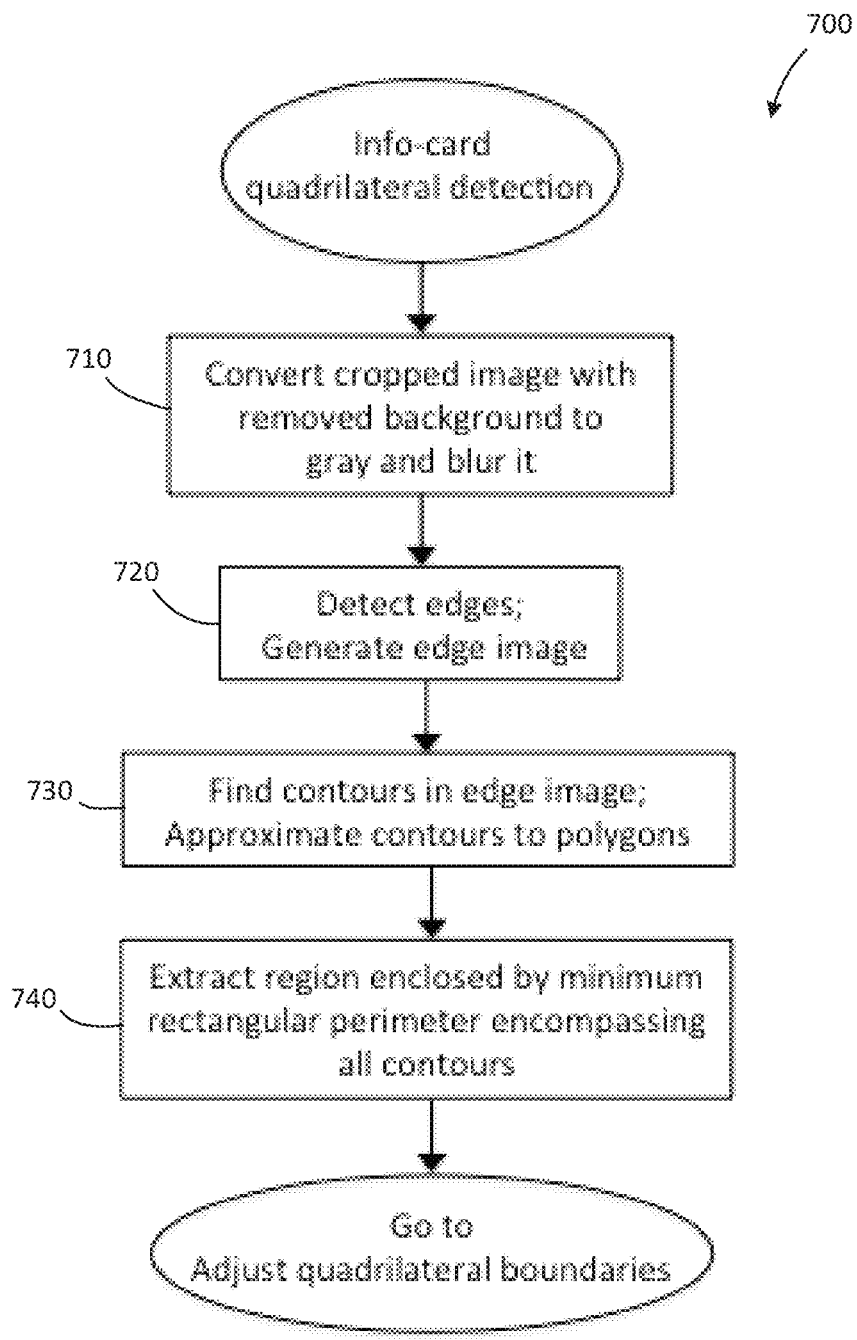
FIG. 7 is a flowchart depicting a method for more precise card image quadrilateral determination, according to one embodiment.

FIG. 7 is a flowchart depicting a method 700 for more precise card image quadrilateral determination, according to one embodiment. First, in a step 710, the cropped image with partially removed background (for example, generated in step 640 of FIG. 6) is converted to a gray image. It may then be blurred and, in a step 720, subjected to an edge detection process to generate an edge image with detected edges. Next, in a step 730, the edge image may be processed for contour detection, and the resulting contour image may further be processed to approximate contours with closed polygons. Subsequently, in a step 740, the contour/polygon image may be processed to determine the minimum rectangular perimeter enclosing all present contours. The above steps may generate a rectangular enclosure potentially containing a card image 207. However, this enclosure may be larger than the card image quadrilateral due to artifacts generated during the process of cropped image segmentation. Therefore, in at least one embodiment, further adjustments are performed to squeeze this intermediate rectangular shape to the minimum rectangular area containing card image 207.

Figure 8:
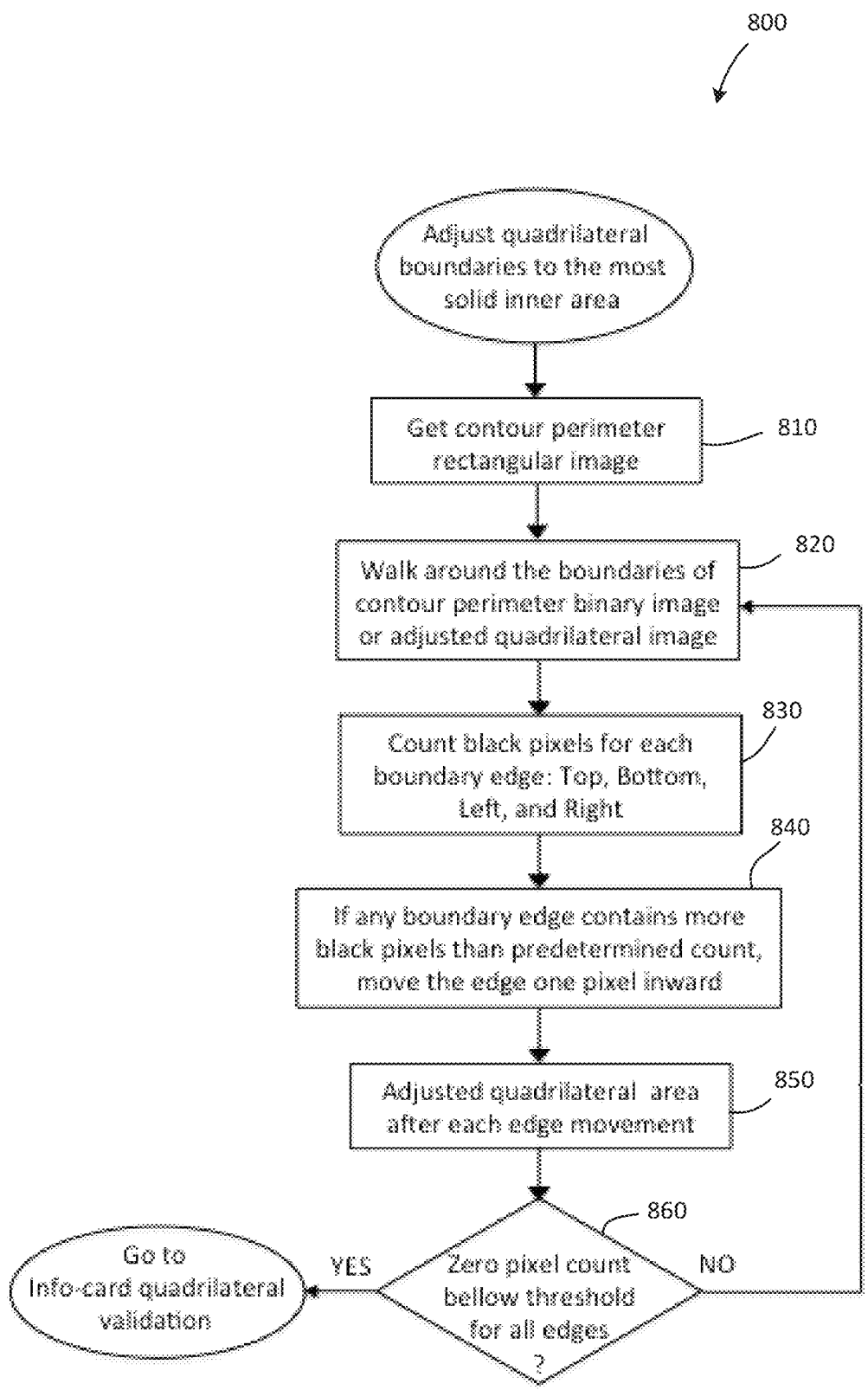
FIG. 8 is a flowchart depicting a method for adjusting quadrilateral boundaries of the enclosure encompassing all detected contours, according to one embodiment.

FIG. 8 is a flowchart depicting an exemplary method 800 for adjusting quadrilateral boundaries of the enclosure encompassing all detected contours (for example, generated by step 740 of FIG. 7), according to one embodiment. The enclosure may enclose the inner area such that a great majority of perimeter pixels of the squeezed new enclosure are of identical pixel intensity (such as white color in this particular example). Method 800 may remove any undesirable inner-area artifacts extending outward, thus providing a new, tighter enclosure that may contain a valid card image 207.

The method of FIG. 8 may begin with a step 810, in which the contour perimeter is received. The contour perimeter may be a rectangular image. In a step 820, system 100 may "walk" around the boundaries of the rectangular enclosure image encompassing all detected contours (or the quadrilateral image), and in a step 830, count black level valued pixels for each boundary edge: top, bottom, left, and right. Next, in a step 840, if any boundary edge contains more black-valued pixels than a predetermined count, that edge is moved inward by one pixel, providing an adjusted quadrilateral area 850. This process continues until a query 860 determines that the black-valued pixel count for all edges of the squeezed quadrilateral falls below a predetermined threshold. The resulting squeezed rectangle represents a potential card image enclosure, which may be validated in the processing steps described in connection with the flowchart of FIG. 9.

Figure 9:
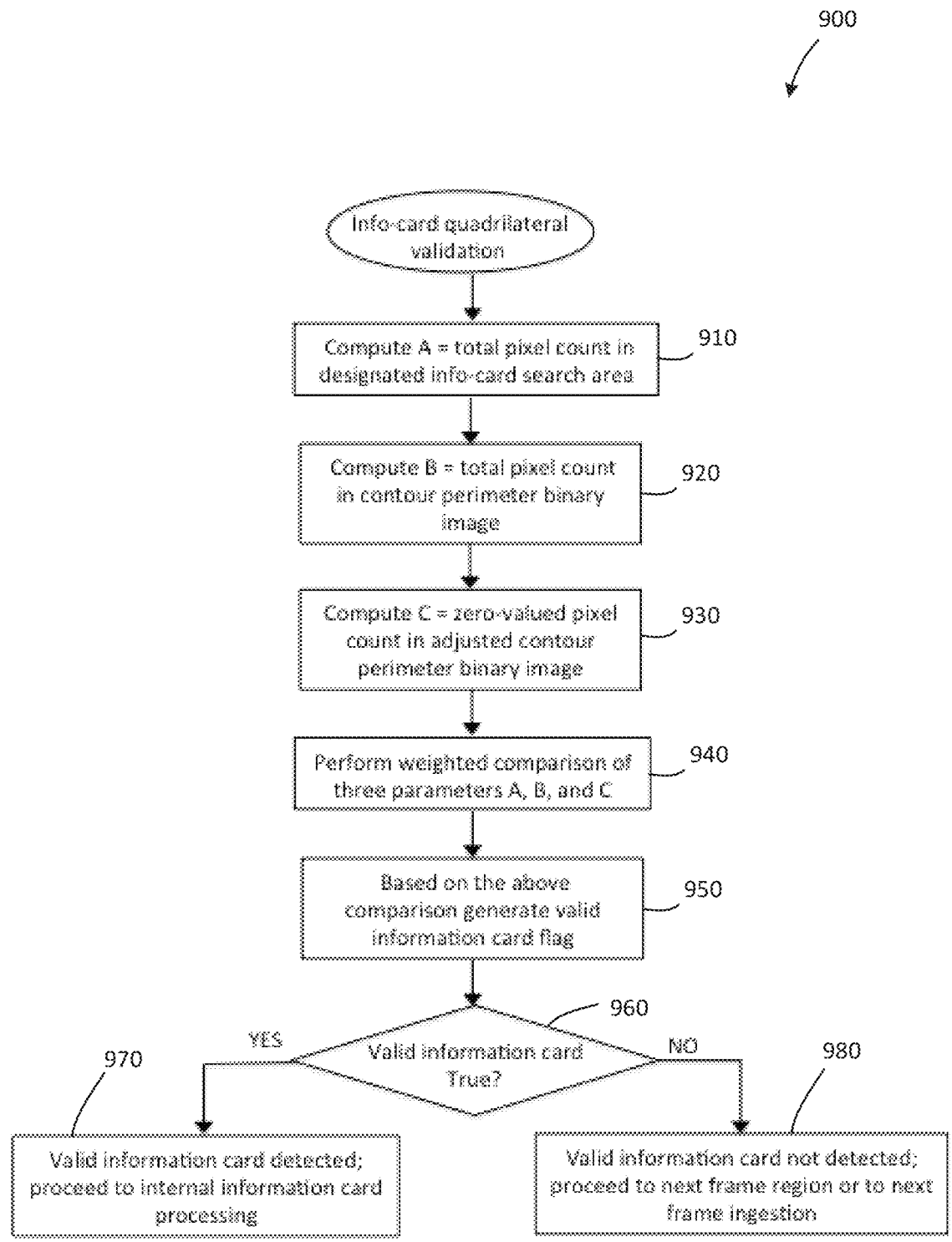
FIG. 9 is a flowchart depicting a method for card image quadrilateral validation, according to one embodiment.

FIG. 9 is a flowchart depicting an exemplary method 900 for card image quadrilateral validation, according to one embodiment. Method 900 may involve analysis of the area (the pixel count) of three different images: the cropped image area (for example, generated in step 610 of FIG. 6), the area of the rectangular enclosure image encompassing all detected contours (for example, generated in step 740 of FIG. 7), and the area of the image with adjusted (squeezed) quadrilateral boundaries (for example, generated in one or more iterations of step 840 of FIG. 8). Three parameters (A, B, C) may be generated in a step 910, a step 920, and a step 930, respectively, as follows:

A=total pixel count in the cropped image area;

B=total pixel count in the contour perimeter binary image;

C=black-valued pixel count in the adjusted contour perimeter binary image.

Next, in a step 940, a weighted comparison of these three parameters may be performed, such that if a viable card image quadrilateral is to be detected, the squeezed quadrilateral none-black valued pixel area stands in a particular proportion with respect to the other two parameters. In a step 950, based on the above weighted comparison, if a valid card image 207 has been detected, a flag is set to true. Pursuant to a query 960, if the flag is set to true, system 100 may proceed to a step 970 in which card image 207 (and/or a processed version of card image 207) is passed to card image internal content processing. In step 950, if a valid card image 207 has not been detected, the flag is set to false, and pursuant to query 960, system 100 may proceed, in a step 980, to the next designated frame region to search for a viable card image 207 therein, or to next video frame 300.

Figure 10:
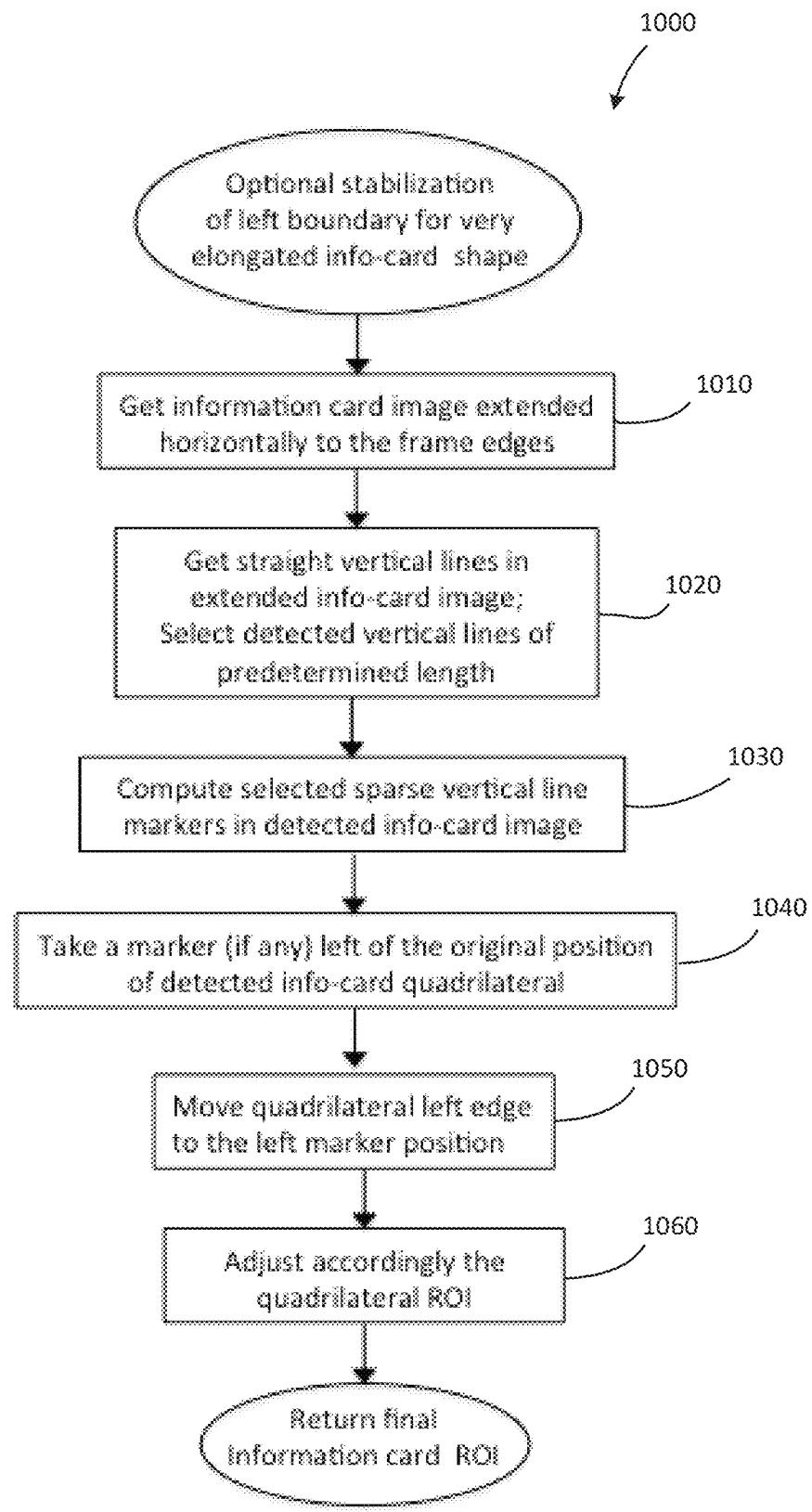
FIG. 10 is a flowchart depicting a method for optional stabilization of the left boundary for very elongated card image shapes, according to one embodiment.

FIG. 10 is a flowchart depicting an exemplary method 1000 for optional stabilization of the left (or any other) boundary for very elongated card image shapes, according to one embodiment. The process may commence with a step 1010 in which system 100 extends a horizontal card image 207 to the cropped frame edges. In a step 1020, system 100 may detect straight vertical lines in this extended image. The process may further involve, in a step 1030, selecting detected vertical lines of predetermined length and computing selected sparse vertical line markers. Finally, in a step 1040, a marker (if any is found in the immediate proximity) left of the original position of card image 207 is selected, and in a step 1050 the quadrilateral left edge is moved to the position of the marker residing further to the left of the original edge position of the detected card image quadrilateral. In a step 1060, the card image quadrilateral is adjusted accordingly, and the updated region of interest (ROI) for the card is returned.

Card Image Internal Processing for Information Extraction

In at least one embodiment, an automated process is performed, including receiving a digital video stream (which may include one or more highlights of a broadcast sporting event), analyzing one or more video frames of the digital video stream for the presence of card images 207, extracting card image 207, localizing text boxes within card image 207, and interpreting text residing within the text boxes to create metadata 224 associating content from card image 207 with video highlights of the analyzed digital video stream.

Figure 11:
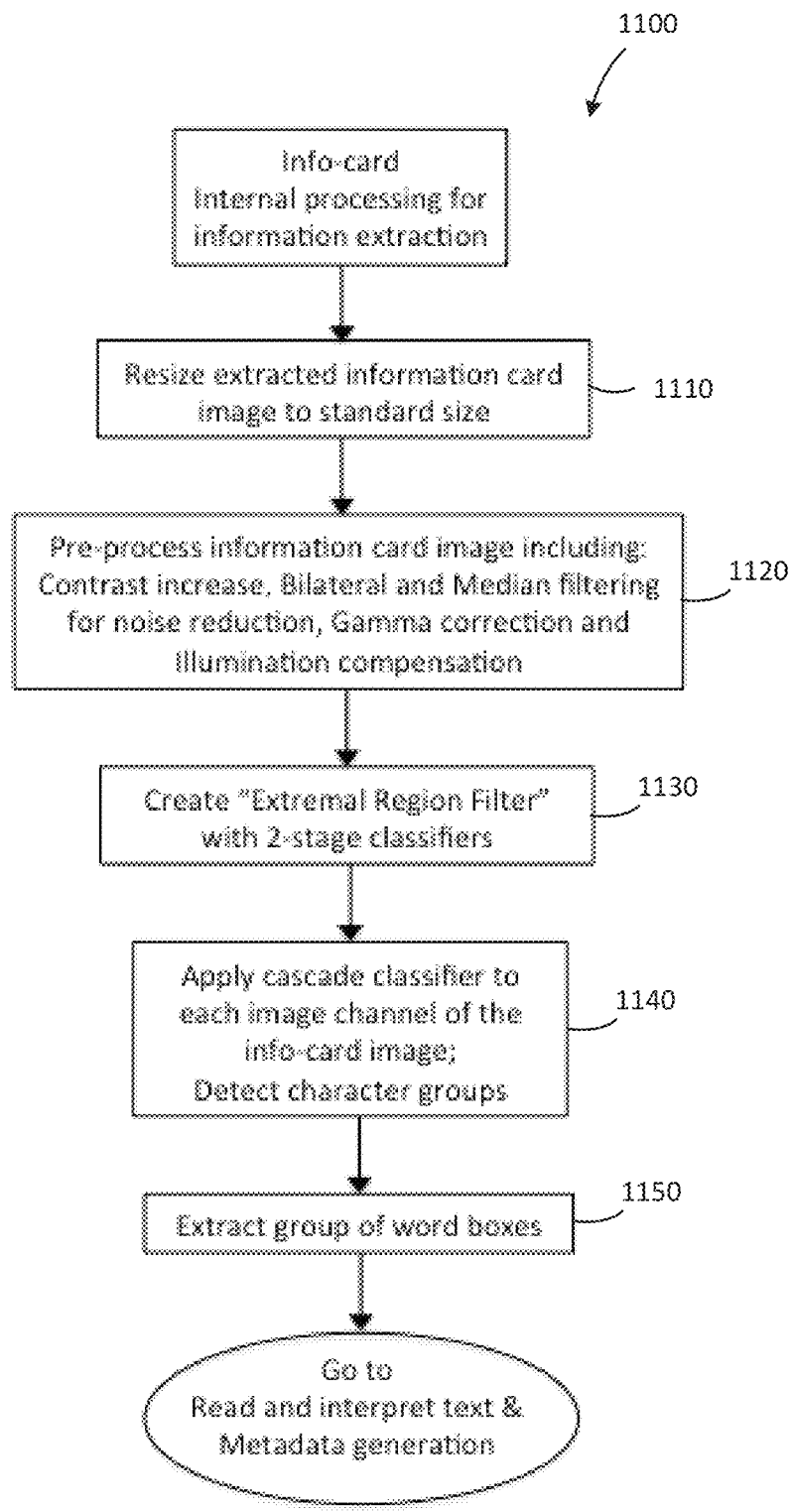
FIG. 11 is a flowchart depicting a method for performing text extraction from card images 207, according to one embodiment.

FIG. 11 is a flowchart depicting a method 1100 for performing text extraction from card images 207, according to one embodiment. In a step 1110, an extracted card image 207 may be resized to a standard size. Next, in a step 1120, resized card image 207 may be pre-processed using a chain of filters, including for example: contrast increase, bilateral and median filtering for noise reduction, and gamma correction followed by illumination compensation. In at least one embodiment, in a step 1130, an "Extremal Region Filter" with 2-stage classifiers is created (e.g., L. Neumann, J. Matas, "Real-Time Scene Text Localization and Recognition", 5th IEEE Conference on Computer Vision and Pattern Recognition, Providence, R.I., June 2012), and in a step 1140, a cascade classifier is applied to each image channel of card image 207. Next, in a step 1150, character groups are detected, and groups of word boxes are extracted.

In at least one embodiment, a plurality of text strings (text boxes) are identified within card image 207, and the location and size of each character in the string of characters associated with said text boxes is detected. Next, text strings from various fields of card image 207 are processed and interpreted, and corresponding metadata 224 are generated, thus providing real-time information related to the current sporting event television program, and the current timeline associated with processed embedded card images 207.

Figure 12:
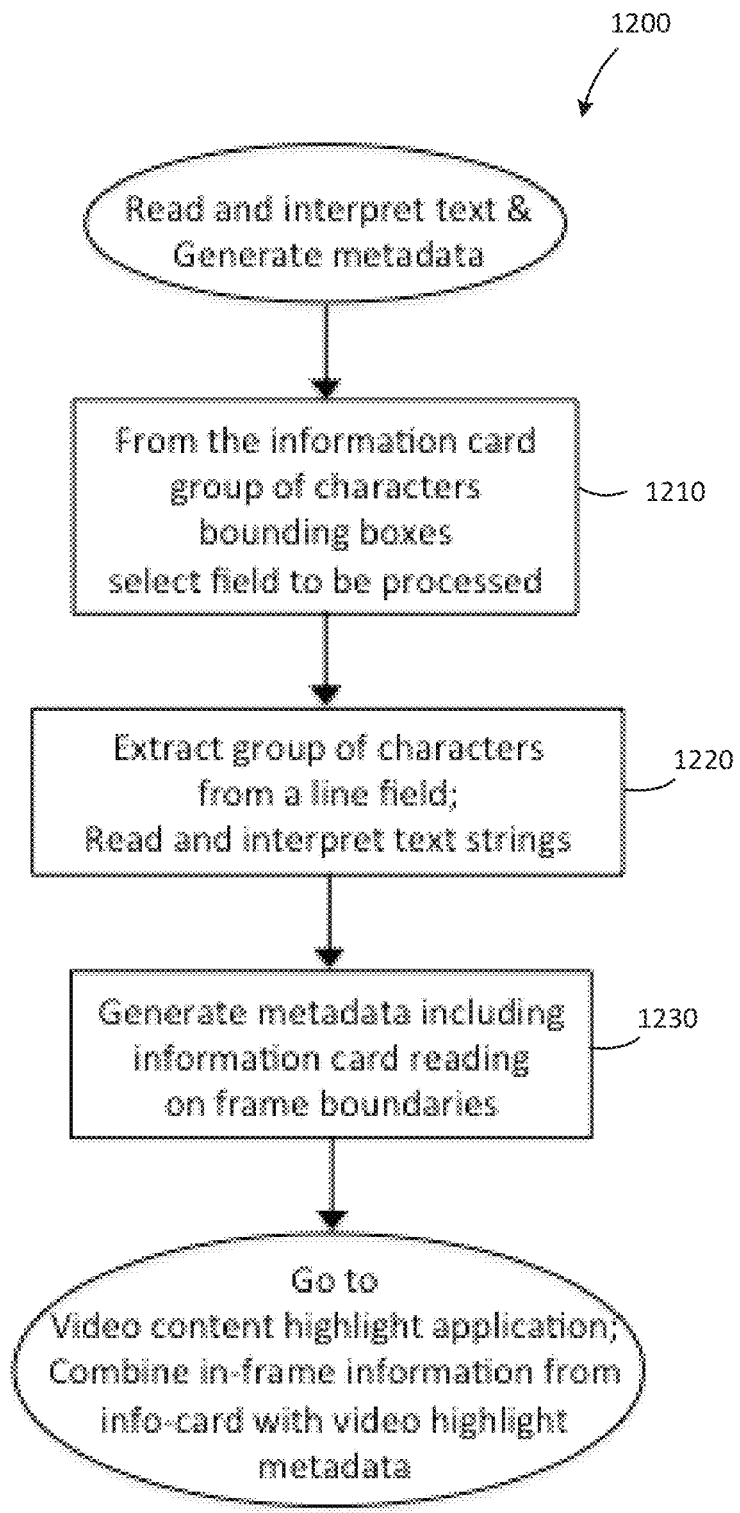
FIG. 12 is a flowchart depicting a method for performing text string processing and interpretation, according to one embodiment.

FIG. 12 is a flowchart depicting a method 1200 for performing text string processing and interpretation, according to one embodiment. In a step 1210, detected and extracted card image 207 may be processed, and the text to be interpreted may be selected from a group of character bounding boxes in card image 207. Next, in a step 1220, text may be extracted and the extracted text may be read and interpreted, for example, via Optical Character Recognition (e. g., "An Overview of the Tesseract OCR Engine", R. Smith, Proceedings ICDAR '07, Vol. 02, September 2007). In a step 1230, metadata 224 may be generated and structured. The in-frame information from card image 207 is then combined with video highlight textual and visual metadata.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within the memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. The program and its associated data may also be hosted and run remotely, for example on a server. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a desktop computer, laptop computer, television, smartphone, tablet, music player, audio device, kiosk, set-top box, game system, wearable device, consumer electronic device, server computer, and/or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for extracting metadata from a video stream, the method comprising:
   at a data store, storing video frames of the video stream;
   at a processor, automatically identifying and extracting a card image embedded in at least one video frame of the video frames by:
     determining whether a predetermined location of the card image is known based on a network associated with the video stream;
     based on determining that the predetermined location is known, processing the predetermined location, within the video frame, that defines a video frame region containing the card image; and
     based on determining that the predetermined location is not known, sequentially processing a plurality of regions of the video frame to identify the video frame region containing the card image;
   at the processor, analyzing the card image to obtain the metadata; and
   at the data store, storing the metadata in association with at least one of the video frames.

2. The method of claim 1, wherein:
   the video stream comprises a broadcast of a sporting event;
   the video frames constitute a highlight deemed to be of particular interest to one or more users; and
   the metadata is descriptive of a status of the sporting event during the highlight.

3. The method of claim 2, further comprising, at an output device, presenting the metadata during viewing of the highlight.

4. The method of claim 3, wherein automatically identifying and extracting the card image and analyzing the card image to obtain the metadata are carried out, for the highlight, during the viewing of the highlight.

5. The method of claim 1, further comprising localizing and extracting the card image from the video frame region.

6. The method of claim 5, wherein the localizing and extracting the card image from the video frame region comprises cropping the video frame to isolate the video frame region.

7. The method of claim 5, wherein the localizing and extracting the card image from the video frame region comprises:
   segmenting the video frame region, or a processed version of the video frame region, to generate a segmented image; and
   modifying pixel values of segments adjacent to boundaries of the segmented image.

8. The method of claim 5, wherein the localizing and extracting the card image from the video frame region comprises removing background from the video frame region or a processed version of the video frame region.

9. The method of claim 5, wherein the localizing and extracting the card image from the video frame region comprises:
   generating an edge image based on the video frame region with removed background;
   finding contours in the edge image;
   approximating the contours as polygons; and
   extracting a region enclosed by a minimum rectangular perimeter encompassing all of the contours to generate a perimeter rectangular image.

10. The method of claim 9, further comprising iteratively:
    counting color-modified pixels for each edge of the perimeter rectangular image; and
    moving any boundary edge, with a number of color-modified pixels exceeding a threshold, inward.

11. The method of claim 10, further comprising validating a quadrilateral detected within the region by:
    counting:
    a first number of pixels in the video frame region;
    a second number of pixels in the perimeter rectangular image; and
    a third number of pixels in an adjusted perimeter rectangular image; and
    comparing the first number, the second number, and the third number to determine whether an assumed quadrilateral within the region is viable.

12. The method of claim 5, wherein the localizing and extracting the card image from the video frame region comprises adjusting a left boundary of the card image.

13. A non-transitory computer-readable medium for extracting metadata from a video stream, comprising instructions stored thereon, that when executed by a processor, perform the steps of:
    causing a data store to store video frames of the video stream;
    automatically identifying and extracting a card image embedded in at least one video frame of the video frames by performing at least one of:
       determining whether a predetermined location of the card image is known based on a network associated with the video stream;
       based on determining that the predetermined location is known, processing the predetermined location, within the video frame, that defines a video frame region containing the card image; and
       based on determining that the predetermined location is not known, sequentially processing a plurality of regions of the video frame to identify the video frame region containing the card image;
    analyzing the card image to obtain the metadata; and
    causing the data store to store the metadata in association with at least one of the video frames.

14. The non-transitory computer-readable medium of claim 13, wherein:
    the video stream comprises a broadcast of a sporting event;
    the video frames constitute a highlight deemed to be of particular interest to one or more users; and
    the metadata is descriptive of a status of the sporting event during the highlight.

15. The non-transitory computer-readable medium of claim 14, further comprising instructions stored thereon, that when executed by a processor, cause an output device to present the metadata during viewing of the highlight.

16. The non-transitory computer-readable medium of claim 15, wherein automatically identifying and extracting the card image and analyzing the card image to obtain the metadata are carried out, for the highlight, during the viewing of the highlight.

17. The non-transitory computer-readable medium of claim 13, further comprising instructions stored thereon, that when executed by a processor, localize and extract the card image from the video frame region.

18. The non-transitory computer-readable medium of claim 17, wherein the localizing and extracting the card image from the video frame region comprises cropping the video frame to isolate the video frame region.

19. The non-transitory computer-readable medium of claim 17, wherein the localizing and extracting the card image from the video frame region comprises:
    segmenting the video frame region, or a processed version of the video frame region, to generate a segmented image; and
    modifying pixel values of segments adjacent to boundaries of the segmented image.

20. The non-transitory computer-readable medium of claim 17, wherein the localizing and extracting the card image from the video frame region comprises removing background from the video frame region or a processed version of the video frame region.

21. The non-transitory computer-readable medium of claim 17, wherein the localizing and extracting the card image from the video frame region comprises:
    generating an edge image based on the video frame region with removed background;
    finding contours in the edge image;
    approximating the contours as polygons; and
    extracting a region enclosed by a minimum rectangular perimeter encompassing all of the contours to generate a perimeter rectangular image.

22. A system for extracting metadata from a video stream, the system comprising:
    a data store configured to store video frames of the video stream; and
    a processor configured to:
    automatically identify and extract a card image embedded in at least one video frame of the video frames by performing at least one of:
       determining whether a predetermined location of the card image is known based on a network associated with the video stream;
       based on determining that the predetermined location is known, processing the predetermined location, within the video frame, that defines a video frame region containing the card image; and
       based on determining that the predetermined location is not known, sequentially processing a plurality of regions of the video frame to identify the video frame region containing the card image; and analyze the card image to obtain the metadata;

wherein the data store is further configured to store the metadata in association with at least one of the video frames.

23. The system of claim 22, wherein:

the video stream comprises a broadcast of a sporting event;

the video frames constitute a highlight deemed to be of particular interest to one or more users; and the metadata is descriptive of a status of the sporting event during the highlight.

24. The system of claim 23, further comprising an output device configured to present the metadata during viewing of the highlight.

25. The system of claim 24, wherein the processor is further configured to automatically identify and extract the card image and analyze the card image to obtain the metadata for the highlight during the viewing of the highlight.

26. The system of claim 22, wherein the processor is further configured to localize and extract the card image from the video frame region.

27. The system of claim 26, wherein the processor is further configured to localize and extract the card image from the video frame region by cropping the video frame to isolate the video frame region.

28. The system of claim 26, wherein the processor is further configured to localize and extract the card image from the video frame region by:

segmenting the video frame region, or a processed version of the video frame region, to generate a segmented image; and modifying pixel values of segments adjacent to boundaries of the segmented image.

29. The system of claim 26, wherein the processor is further configured to localize and extract the card image from the video frame region by removing background from the video frame region or a processed version of the video frame region.

30. The system of claim 26, wherein the processor is further configured to localize and extract the card image from the video frame region by:

generating an edge image based on the video frame region with removed background;

finding contours in the edge image;

approximating the contours as polygons; and extracting a region enclosed by a minimum rectangular perimeter encompassing all of the contours to generate a perimeter rectangular image.

* * * * *